United States Patent
Oyama

(10) Patent No.: US 12,198,386 B2
(45) Date of Patent: Jan. 14, 2025

(54) VEHICLE EXTERNAL ENVIRONMENT IMAGING APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 143 days.

(21) Appl. No.: 17/747,045

(22) Filed: May 18, 2022

(65) Prior Publication Data

US 2022/0383548 A1    Dec. 1, 2022

(30) Foreign Application Priority Data

May 28, 2021 (JP) ................................. 2021-089844

(51) Int. Cl.
*G06T 7/80* (2017.01)
*B60R 1/27* (2022.01)
(Continued)

(52) U.S. Cl.
CPC .................. *G06T 7/85* (2017.01); *B60R 1/27* (2022.01); *B60R 11/04* (2013.01); *B60W 50/14* (2013.01);
(Continued)

(58) Field of Classification Search
CPC ..... G06T 7/85; G06T 7/11; G06T 7/70; G06T 2207/10012; G06T 2207/20021; G06T 2207/30252; G06T 7/593; B60R 1/27; B60R 11/04; B60R 2011/004; B60W 50/14; B60W 2050/143; B60W 2050/146; G06V 20/588; G06V 20/56
(Continued)

(56) References Cited

U.S. PATENT DOCUMENTS

| 7,663,476 B2 * | 2/2010 | Watanabe | B60R 1/00 382/148 |
| 8,885,045 B2 * | 11/2014 | Yanagi | B60R 1/00 348/148 |

(Continued)

FOREIGN PATENT DOCUMENTS

| JP | 2018-194538 A | 12/2018 |
| WO | 2015/029934 A1 | 3/2015 |

*Primary Examiner* — Christopher S Kelley
*Assistant Examiner* — Asmamaw G Tarko
(74) *Attorney, Agent, or Firm* — Rimon P.C.

(57) ABSTRACT

A vehicle external environment imaging apparatus includes imaging devices and a controller. The imaging devices are disposed on a vehicle to perform imaging of a vehicle external environment. The controller generates information regarding a distance or a direction of a vehicle-external imaging target with imaging images of the imaging devices. At least two imaging devices are disposed on the vehicle to be able to perform duplicated imaging of a common imaging region. The controller generates, on the basis of a distance and a direction in an imaging image obtained by a first one of the at least two imaging devices, correction information regarding a distance, a direction or both of the vehicle-external imaging target based on an imaging position which is to be used in a monocular process on an imaging image of at least one the at least two imaging devices that is different from the first one.

14 Claims, 12 Drawing Sheets

(51) Int. Cl.
- *B60R 11/00* (2006.01)
- *B60R 11/04* (2006.01)
- *B60W 50/14* (2020.01)
- *G06T 7/11* (2017.01)
- *G06T 7/70* (2017.01)
- *G06V 20/56* (2022.01)

(52) U.S. Cl.
CPC .................. *G06T 7/11* (2017.01); *G06T 7/70* (2017.01); *G06V 20/588* (2022.01); *B60R 2011/004* (2013.01); *B60W 2050/143* (2013.01); *B60W 2050/146* (2013.01); *G06T 2207/10012* (2013.01); *G06T 2207/20021* (2013.01); *G06T 2207/30252* (2013.01)

(58) Field of Classification Search
USPC ............................................ 348/42, 47, 148
See application file for complete search history.

(56) References Cited

U.S. PATENT DOCUMENTS

| | | | |
|---|---|---|---|
| 9,598,012 B2* | 3/2017 | Nagata | B60R 1/00 |
| 10,089,538 B2* | 10/2018 | Molin | H04N 23/90 |
| 10,183,621 B2* | 1/2019 | Hodohara | H04N 7/181 |
| 11,148,595 B2* | 10/2021 | Kondo | G06T 11/00 |
| 11,244,173 B2* | 2/2022 | Iida | B60R 11/04 |
| 2003/0085999 A1* | 5/2003 | Okamoto | B60R 1/00 |
| | | | 348/E7.086 |
| 2006/0192660 A1* | 8/2006 | Watanabe | B60R 1/00 |
| | | | 348/E7.086 |
| 2015/0235093 A1* | 8/2015 | Shima | G06T 7/254 |
| | | | 382/103 |
| 2016/0176343 A1 | 6/2016 | Sakano et al. | |
| 2016/0347251 A1* | 12/2016 | Shigemura | B60R 1/00 |
| 2018/0174327 A1* | 6/2018 | Singh | G06T 7/80 |
| 2018/0336695 A1 | 11/2018 | Fujimura et al. | |
| 2020/0064483 A1* | 2/2020 | Li | G01S 7/4026 |
| 2020/0086871 A1* | 3/2020 | Gotoda | G05D 1/0088 |
| 2020/0349366 A1* | 11/2020 | Takemura | B60Q 9/00 |
| 2020/0377100 A1* | 12/2020 | Sano | B60W 30/10 |

* cited by examiner

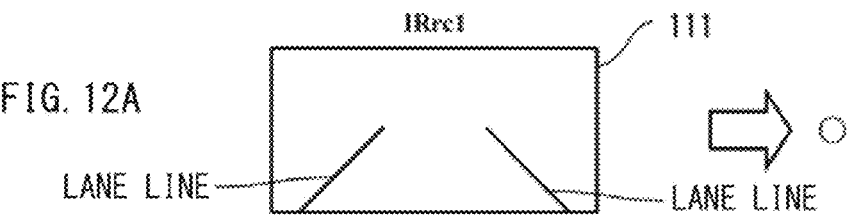
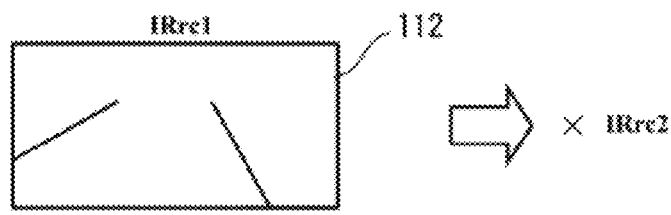
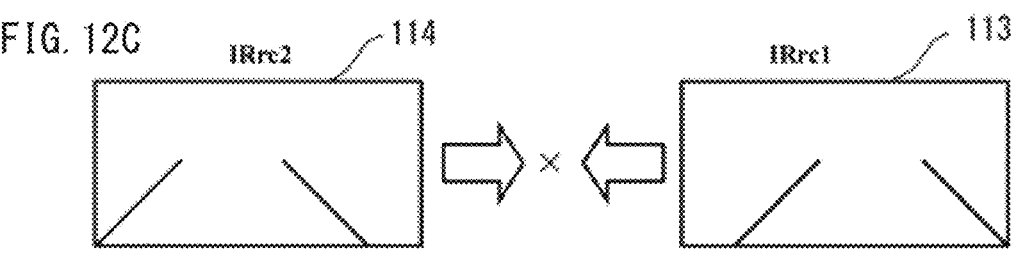
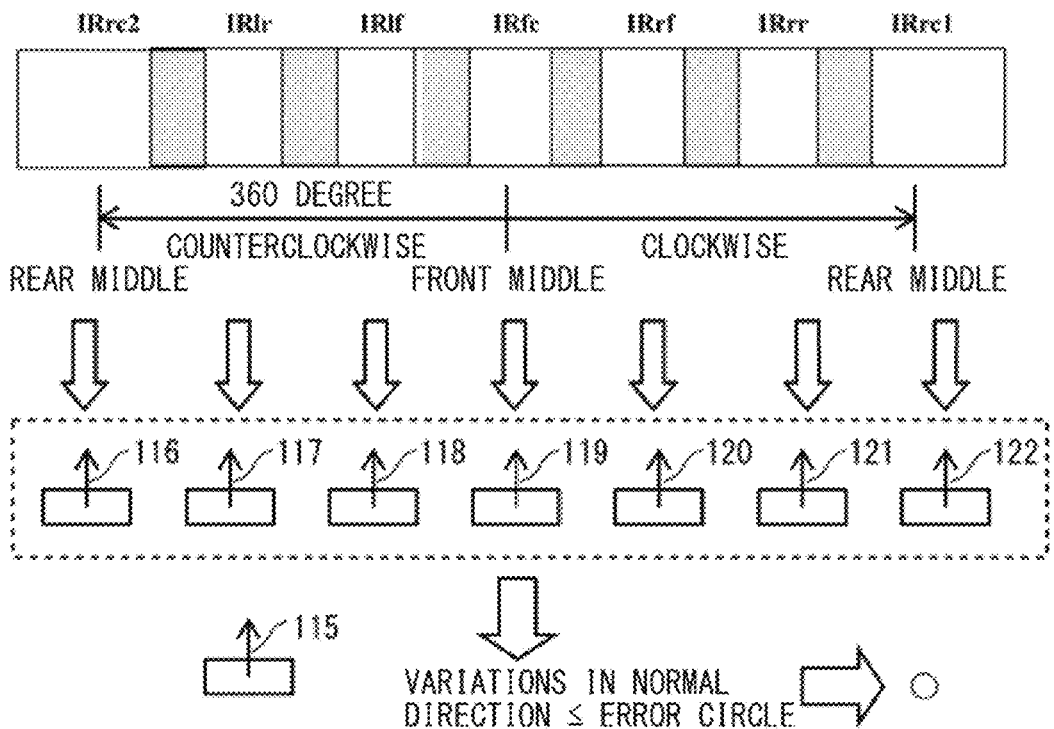

VEHICLE EXTERNAL ENVIRONMENT IMAGING APPARATUS

CROSS-REFERENCE TO RELATED APPLICATIONS

This application claims priority from Japanese Patent Application No. 2021-089844 filed on May 28, 2021, the entire contents of which are hereby incorporated by reference.

BACKGROUND

The technology relates to a vehicle external environment imaging apparatus.

A vehicle is provided with an imaging device configured to perform imaging of a vehicle external environment, for example, as disclosed in Japanese Unexamined Patent Application Publication No. 2018-194538 and International Publication No. WO2015/029934.

Such a configuration makes it possible to generate information regarding a relative distance or a relative direction of an imaging target present in the vehicle external environment with use of an imaging image obtained by the imaging device provided on the vehicle.

Such information regarding the distance or the direction of the imaging target present in the vehicle external environment is very important in an automated driving control or a driving assist control.

Accordingly, it has been considered to dispose two or more imaging devices at respective portions of the vehicle and to cause the imaging devices to perform imaging of respective divided regions into which a 360-degree region surrounding the vehicle is divided.

SUMMARY

An aspect of the technology provides a vehicle external environment imaging apparatus that includes imaging devices and a controller. The imaging devices are disposed on a vehicle to perform imaging of a vehicle external environment of the vehicle. The controller is configured to generate information regarding a distance, a direction, or both of a vehicle-external imaging target with use of imaging images obtained by the respective imaging devices. The vehicle-external imaging target is present in the vehicle external environment. At least two imaging devices of the imaging devices are disposed on the vehicle to be able so as to perform duplicated imaging of an imaging region common to the at least two imaging devices. The controller is configured to generate, on the basis of a distance and a direction in an imaging image obtained by a first one of the at least two imaging devices, correction information regarding a distance, a direction, or both of the vehicle-external imaging target based on an imaging position. The correction information is to be used in a monocular process performed on an imaging image obtained by at least one of the at least two imaging devices that is different from the first one of the at least two imaging devices.

An aspect of the technology provides a vehicle external environment imaging apparatus that includes cameras and circuitry. The cameras are to be disposed on a vehicle to perform imaging of a vehicle external environment of the vehicle. The circuitry is configured to generate information regarding a distance, a direction, or both of a vehicle-external imaging target with use of imaging images obtained by the respective cameras. The vehicle-external imaging target is present in the vehicle external environment. At least two cameras of the cameras are to be disposed on the vehicle so as to be able to perform duplicated imaging of an imaging region common to the at least two cameras. The circuitry is configured to generate, on the basis of a distance and a direction in an imaging image obtained by a first one of the at least two cameras, correction information regarding the distance, the direction, or both of the vehicle-external imaging target based on an imaging position. The correction information is to be used in a monocular process performed on an imaging image obtained by at least one of the at least two cameras that is different from the first one of the at least two cameras.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 12A to 12D are diagrams for describing examples of a method of evaluating shift corrections.

DETAILED DESCRIPTION

Figure 1:
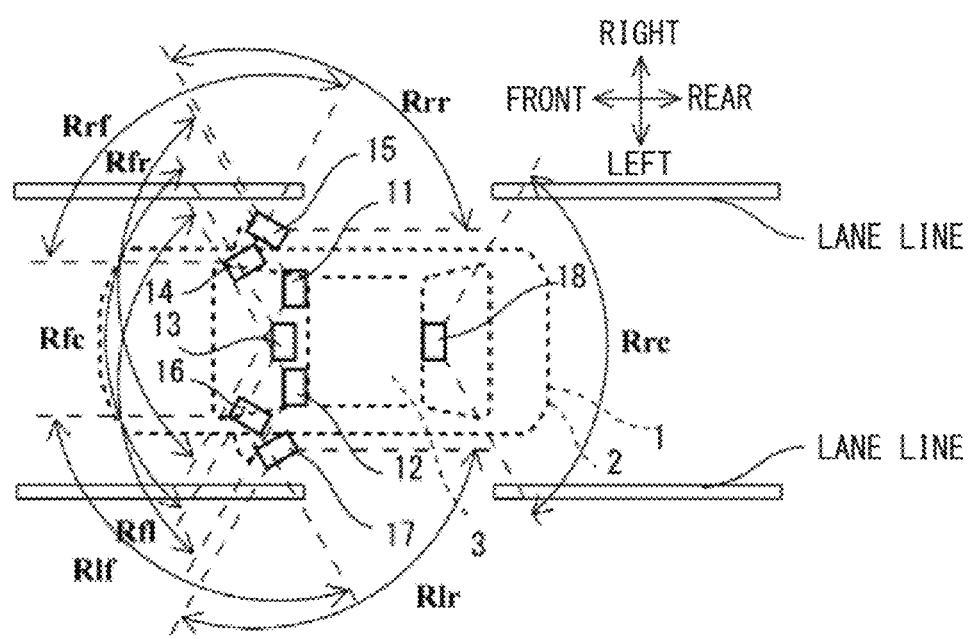
FIG. 1 is a diagram for describing an example of a vehicle to which a vehicle external environment imaging apparatus according to an embodiment of the technology is to be applied.

Regarding an imaging device to be disposed on a vehicle, it is important that an imaging range, an angle of view, etc. of the imaging device are not changed by a factor such as vibration caused by traveling of the vehicle.

For example, in a case where two or more imaging devices perform imaging of respective divided regions into which a 360-degree surrounding region is divided, even a slight change in imaging range or angle of view of a single imaging device can easily influence a process based on respective imaging images obtained by the imaging devices.

Accordingly, it has been considered to attach each of the imaging devices directly to a vehicle body which is highly rigid.

However, in a case of attaching the imaging devices directly to the vehicle body, the positions to attach the imaging devices are extremely limited. In addition, although shifts of the imaging devices are suppressed by the direct attachment of the imaging devices to the vehicle body, there remains a possibility that positions, directions, etc. of the imaging devices are changed over time even without any factor such as an impact applied on the vehicle body.

It is also conceivable to provide a 360-degree camera, for example, on a roof of the vehicle, instead of providing the two or more imaging devices. However, employing an imaging device like a 360-degree camera does not eliminate the possibility of the over-time change in position, direction, etc. of the imaging device.

It is desirable to provide a vehicle external environment imaging apparatus that makes it possible to secure or maintain reliability.

In the following, some embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a diagram for describing a vehicle 1 to which a vehicle external environment imaging apparatus 10 according to an embodiment of the technology is to be applied. The vehicle 1 may be, for example but not limited to, an automobile.

Referring to FIG. 1, the vehicle 1 may include a vehicle body 2. The vehicle body 2 may be provided with a vehicle compartment 3 which an occupant is to get in.

The vehicle 1 may be one example of a vehicle. In FIG. 1, the vehicle 1 is traveling forward along a traveling lane between a pair of lane lines on a straight road.

As to the vehicle 1, research and development of a traveling control, for example, by means of automated driving or driving assist has been in progress.

In a case where the vehicle 1 travels by means of automated driving or driving assist, the vehicle 1 may need to acquire information regarding a traveling environment outside the vehicle 1. Accordingly, the vehicle 1 may be provided with imaging devices 11 to 18 as illustrated in FIG. 1, or may be provided with a sensor using an output wave, such as a LiDAR.

For example, as illustrated in FIG. 1, the vehicle 1 may be provided with the followings as the imaging devices of the vehicle external environment imaging apparatus 10 of the vehicle 1: a front-middle imaging device 13, a front-right imaging device 11, a front-left imaging device 12, a right-front imaging device 14, a right-rear imaging device 15, a left-front imaging device 16, a left-rear imaging device 17, and a rear-middle imaging device 18. In one embodiment, these imaging devices may serve as "imaging devices". In the following description, each of these imaging devices is sometimes simply referred to as an "imaging device". In one embodiment, the imaging devices 13 to 18 may serve as "monocular-process imaging devices".

The front-middle imaging device 13 may be disposed, for example, in the middle of a front portion of the vehicle compartment 3. The front-middle imaging device 13 may perform imaging of a front region of the vehicle 1, i.e., a region on a front side of the vehicle 1, for example, with an angle-of-view range Rfc of 120°.

The front-right imaging device 11 and the front-left imaging device 12 may be disposed in the middle of the front portion of the vehicle compartment 3, for example, while being supported by an unillustrated common stay and having relative positions fixed by the common stay. The front-right imaging device 11 may perform imaging of the front region of the vehicle 1, for example, with an angle-of-view range Rfr of 120°. The front-left imaging device 12 may perform imaging of the front region of the vehicle 1, for example, with an angle-of-view range Rfl of 120°. The front-right imaging device 11 and the front-left imaging device 12 may be so disposed as to be able to perform imaging of the front region of the vehicle 1 with respective imaging ranges that are almost overlapped with each other. The front-right imaging device 11 and the front-left imaging device 12 may form a stereo camera 19. In this case, a compound-eye process related to the stereo camera 19 may allow for generating, with use of an imaging image obtained by the front-right imaging device 11 and an imaging image obtained by the front-left imaging device 12, information regarding a relative distance and a relative direction of an imaging target based on a parallax of the imaging target. The imaging target may be a nearby object, such as a pedestrian, present in the vehicle external environment captured in an imaging region common to the two imaging images. The relative distance and the relative direction to the nearby object acquired by the compound-eye process related to the stereo camera 19 is less influenced, for example, by an attitude or vibration of the vehicle body 2 while the vehicle 1 is traveling, and are therefore expected to be more reliable.

The right-front imaging device 14 may be disposed at a right A-pillar of the vehicle body 2 or a portion of the vehicle compartment 3 near the right A-pillar. The right-front imaging device 14 may perform imaging of a right-front region of the vehicle 1, i.e., a region on a right-front side of the vehicle 1, for example, with an angle-of-view range Rrf of 120°.

The right-rear imaging device 15 may be disposed on a right side surface of the vehicle body 2, for example, at a right door mirror. The right-rear imaging device 15 may perform imaging of a right-rear region of the vehicle 1, i.e., a region on a right-rear side of the vehicle 1, for example, with an angle-of-view range Rrr of 120°.

The left-front imaging device 16 may be disposed at a left A-pillar of the vehicle body 2 or a portion of the vehicle compartment 3 near the left A-pillar. The left-front imaging device 16 may perform imaging of a left-front region of the vehicle 1, i.e., a region on a left-front side of the vehicle 1, for example, with an angle-of-view range Rlf of 120°.

The left-rear imaging device 17 may be disposed on a left side surface of the vehicle body 2, for example, at a left door mirror. The left-rear imaging device 17 may perform imaging of a left-rear region of the vehicle 1, i.e., a region on a left-rear side of the vehicle 1, for example, with an angle-of-view range Rlr of 120°.

The rear-middle imaging device 18 may be disposed, for example, in the middle of a rear portion of the vehicle compartment 3. The rear-middle imaging device 18 may perform imaging of a rear region of the vehicle 1, i.e., a region on a rear side of the vehicle 1, for example, with an angle-of-view range Rrc of 120°.

The front-middle imaging device 13, the right-front imaging device 14, the right-rear imaging device 15, the left-front imaging device 16, the left-rear imaging device 17, and the rear-middle imaging device 18 may thus allow for imaging of a vehicle-external range of a 360-degree region surrounding the vehicle body 2 of the vehicle 1.

Figure 2A:
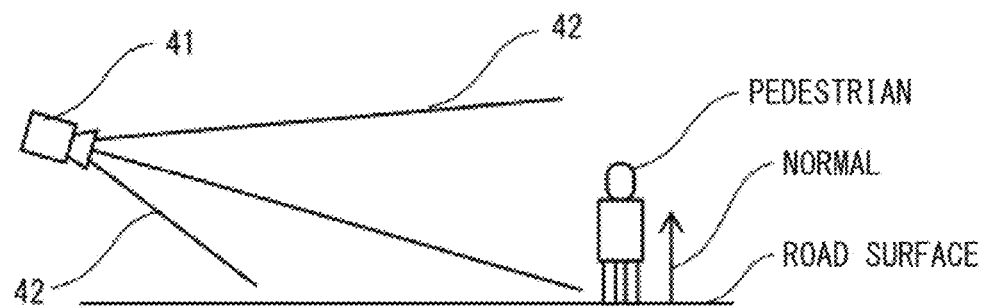
FIGS. 2A to 2C are diagrams for describing examples of an imaging situation and an imaging image related to a monocular process for one of imaging devices illustrated in FIG. 1.
Figure 2B:
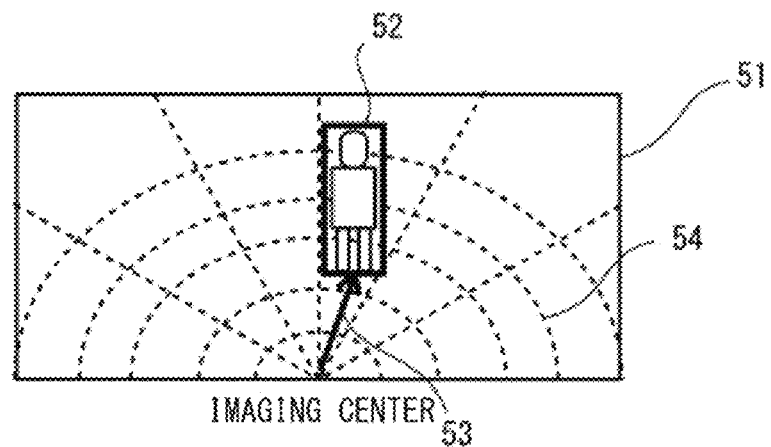
Figure 2C:
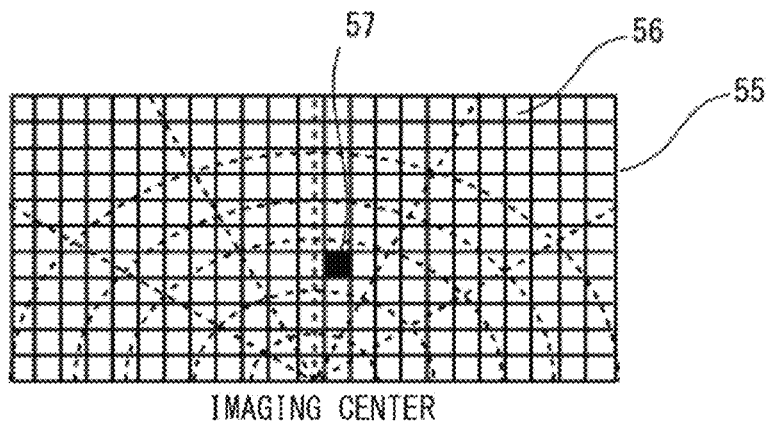

FIGS. 2A to 2C are diagrams for describing an imaging situation and an imaging image related to a monocular process for an imaging device 41. The imaging device 41 may be, for example, any one selected from the front-middle imaging device 13, the right-front imaging device 14, the right-rear imaging device 15, the left-front imaging device 16, the left-rear imaging device 17, and the rear-middle imaging device 18 illustrated in FIG. 1.

FIG. 2A is a diagram for describing the imaging situation related to the imaging device 41. The imaging device 41 illustrated in FIG. 2A may be disposed on the vehicle 1. The imaging device 41 illustrated in FIG. 2A may perform imaging of the vehicle external environment with an upper-lower angle-of-view range 42.

The illustration of FIG. 2A includes a road surface on which the vehicle 1 is traveling and a pedestrian present on the road surface. As to the road surface, a normal that is perpendicular to the road surface is definable.

FIG. 2B is a diagram for describing an imaging image 51 obtained by the imaging device 41 illustrated in FIG. 2A. The imaging image 51 illustrated in FIG. 2B may be an image capturing the vehicle external environment with an upper-lower and left-right angle of view of the imaging device 41. The imaging image 51 includes an image of a pedestrian at a middle portion thereof.

In addition, the imaging image 51 illustrated in FIG. 2B may be provided with schematically illustrated concentric circles around the imaging device 41 as the imaging center. Each of the concentric circles may be a line that couples points having equal distances from the imaging device 41 as the imaging center. The imaging image 51 may also be provided with straight lines extending radially from the imaging center. It is thus possible to associate, with the imaging image 51 obtained by the imaging device 41, a relative distance and a relative direction from the imaging center where the imaging device 41 is located serving as a reference, for each imaging position of the imaging image 51. By means of the monocular process on the imaging image 51, it is possible to obtain a relative distance and a relative direction based on such association on the basis of the imaging position in the imaging image.

FIG. 2C is a diagram for describing a road surface model 55 that may be used in the monocular process and corresponds to the imaging image 51 obtained by the imaging device 41. The imaging image 51 may include, for example, information regarding respective luminance values of pixels that are obtained by dividing the imaging range in a matrix.

In the road surface model 55 illustrated in FIG. 2C, each of the pixels in the imaging image 51 may be associated with a relative distance and a relative direction on the road surface illustrated in FIG. 2A using the imaging center where the imaging device 41 is located as a reference.

In the imaging image 51 illustrated in FIG. 2B, a pixel 57 corresponding to the middle of a lower end of a rectangular frame 52 set around an image of the pedestrian may be identified as representing a relative distance and a relative direction of the pedestrian.

Identifying the pixel 57 in the road surface model 55 illustrated in FIG. 2C may allow for obtainment of a distance and a direction to the pedestrian on the road surface illustrated in FIG. 2A.

It is thus possible to obtain a distance and a direction, on the road surface, of a nearby object present around the vehicle 1 by performing the monocular process based on the single imaging image 51.

In performing a control such as automated driving or driving assist, it is possible to control traveling of the vehicle 1 with use of such information regarding a relative distance or a relative direction to an imaging target present in the vehicle external environment.

The vehicle 1 may acquire information regarding a nearby object that can possibly influence traveling of the vehicle 1 by causing the imaging devices 11 to 18 to perform imaging of respective divided regions into which the 360-degree region surrounding the vehicle 1 is divided into or using a single imaging device that is able to perform 360-degree imaging. This makes it possible to improve reliability in a control of automated driving or driving assist.

Figure 3A:
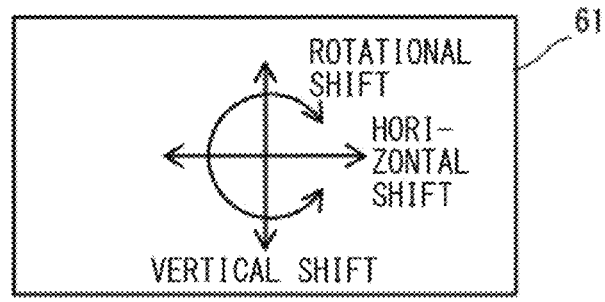
FIGS. 3A to 3C are diagrams for describing an example of a possible influence of a shift related to the imaging device disposed on the vehicle.
Figure 3B:
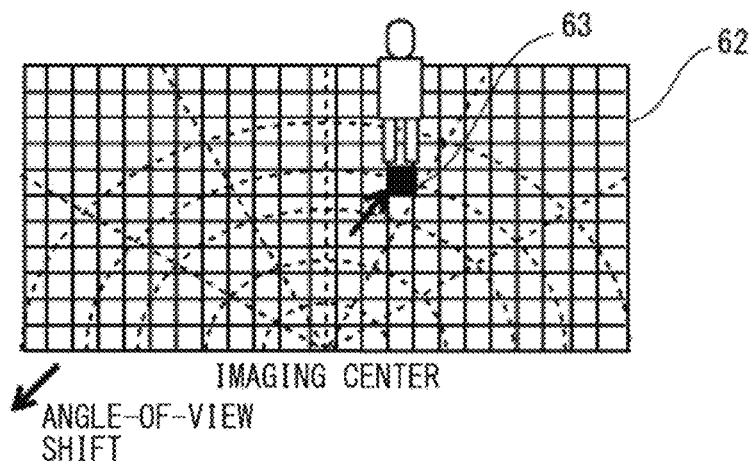
Figure 3C:
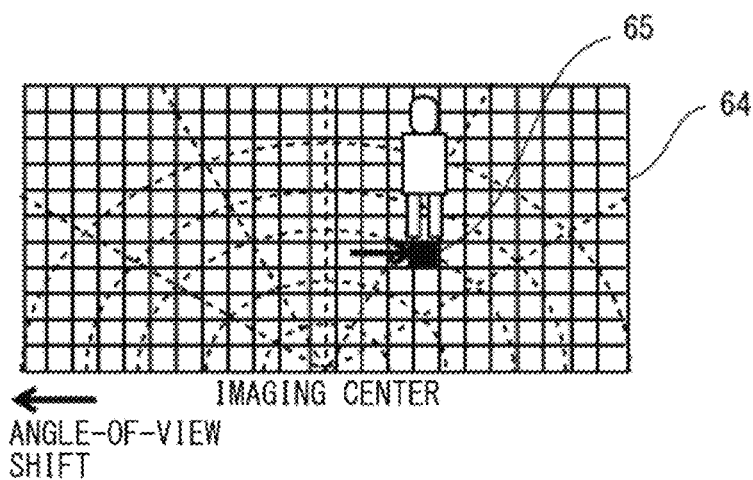

FIGS. 3A to 3C are diagrams for describing a possible influence of a shift related to the imaging device disposed on the vehicle 1.

FIG. 3A is a diagram for describing a possible shift in an imaging image 61 obtained by the imaging device. For example, a change in the attachment state of the imaging device to the vehicle body 2 or a change in the attitude of the vehicle body 2 itself can possibly result in a rotational shift around the center of the imaging image 61, a vertical shift in an upper-lower direction of the imaging image 61, or a horizontal shift in a left-right direction of the imaging image 61 as illustrated in FIG. 3A. Even if the imaging device is attached directly to the vehicle body 2, the position or the direction of the imaging device can sometimes be changed, for example, due to an impact applied on the vehicle body 2. In a case where the imaging device is not attached directly to the vehicle body 2 and it is therefore difficult to expect high attachment rigidity, the attachment state of the imaging device may be shifted easily from a reference position set upon designing or the attachment position set upon manufacture over time.

FIG. 3B illustrates an imaging image 62 in a case where the imaging device is shifted in a lower-left direction from the reference position. The imaging image 62 has a road surface model interposed thereon.

The imaging image 62 illustrated in FIG. 3B is a result of performing imaging of the pedestrian illustrated in FIG. 2A, as with the imaging image 51 illustrated in FIG. 2B.

The direction of the imaging device obtaining the imaging image 62 illustrated in FIG. 3B is shifted in the lower-left direction along the sheet of FIG. 3B.

In this case, the imaging position of the image of the pedestrian included in the imaging image 62 is shifted to a position in an upper-right direction in the imaging image 62.

As a result, a pixel 63 identified as representing the relative distance and the relative direction of the pedestrian is located in the upper-right direction of the pixel 57 identified in FIG. 2C.

The relative distance or the relative direction of the pedestrian identified on the basis of the position of the pixel 63 and the road surface model may be less accurate than that identified on the basis of the imaging image 51 illustrated in FIG. 2B which involves no shift.

FIG. 3C illustrates an imaging image 64 in a case where the imaging device is shifted horizontally in a left direction from the reference position. The imaging image 64 has the road surface model interposed thereon.

The imaging image 64 illustrated in FIG. 3C is a result of performing imaging of the pedestrian illustrated in FIG. 2A, as with the imaging image 51 illustrated in FIG. 2B.

The direction of the imaging device obtaining the imaging image 64 illustrated in FIG. 3C is shifted in the left direction along the sheet of FIG. 3C.

In this case, the imaging position of the image of the pedestrian included in the imaging image 64 is shifted to a position in a right direction in the imaging image 64.

As a result, a pixel 65 identified as representing the relative distance and the relative direction of the pedestrian is located in the right direction of the pixel 57 identified in FIG. 2C.

The relative distance or the relative direction of the pedestrian identified on the basis of the position of the pixel 65 and the road surface model may be less accurate than that identified on the basis of the imaging image 51 illustrated in FIG. 2B which involves no shift.

Figure 4:
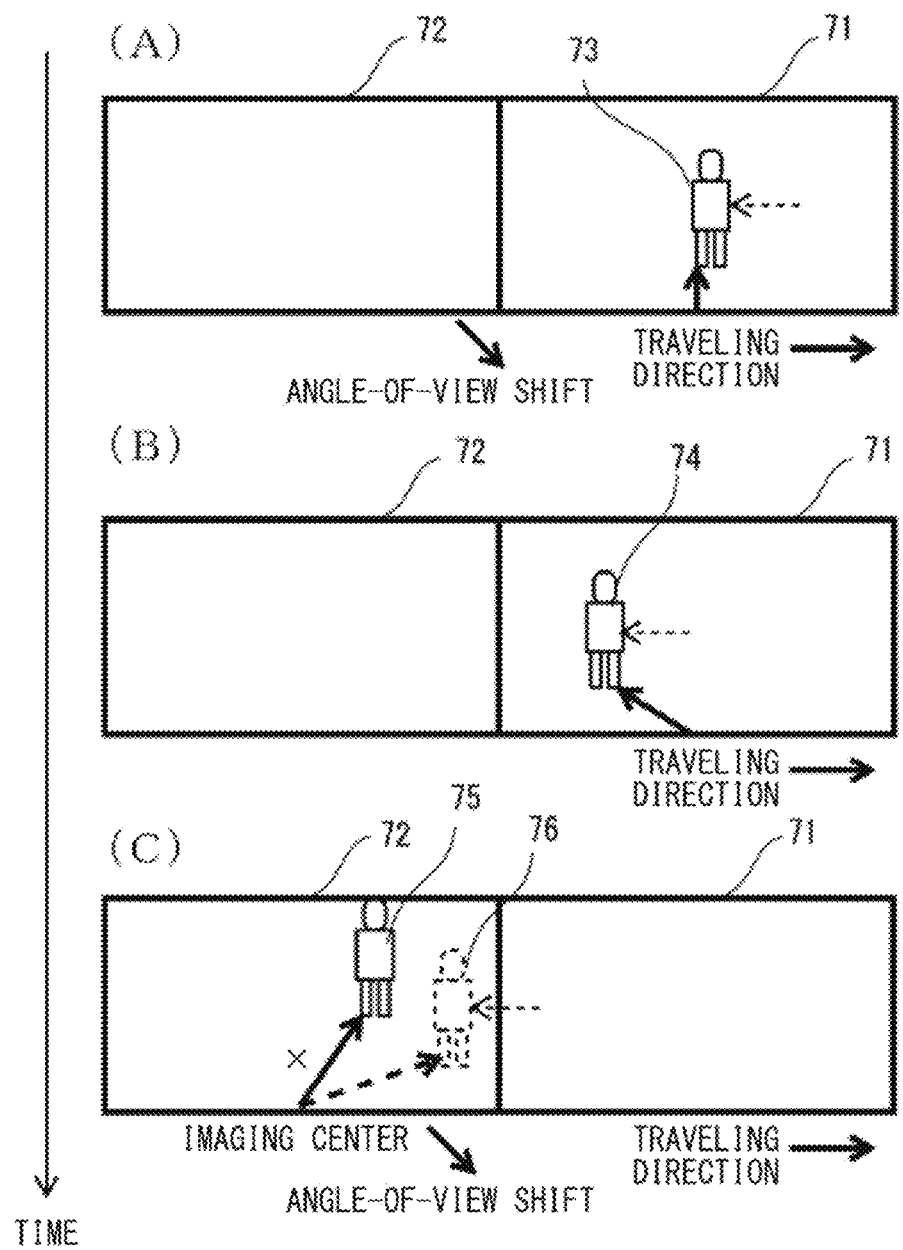
FIG. 4 is a diagram for describing an example of a possible influence of a shift related to the imaging devices disposed on the vehicle.

FIG. 4 is a diagram for describing a possible influence of a shift related to the two or more imaging devices disposed on the vehicle 1.

(A) to (C) of FIG. 4 each illustrate a left-front imaging image 71 and a left-rear imaging image 72 respectively obtained by the left-front imaging device 16 and the left-rear imaging device 17 which are the two imaging devices disposed on the left side of the vehicle 1 traveling forward. (A) to (C) of FIG. 4 illustrate respective imaging images obtained in this order of time.

In FIG. 4, the left-front imaging device 16 is provided at the reference position, while the left-rear imaging device 17 is provided to be shifted from the reference position in a lower-right direction.

(A) of FIG. 4 is a diagram for describing a situation in which a pedestrian as the imaging target is captured in a middle region of the left-front imaging image 71 while the left-rear imaging image 72 remains shifted.

In (A) of FIG. 4, the left-front imaging device 16, of the left-front imaging device 16 and the left-rear imaging device 17, performs imaging of the pedestrian. The pedestrian is captured at a position 73 in a middle region of the left-front imaging image 71 obtained by the left-front imaging device 16.

(B) of FIG. 4 is a diagram for describing a situation in which the pedestrian as the imaging target is captured in a rear region of the left-front imaging image 71 immediately after the situation illustrated in (A) of FIG. 4.

In (B) of FIG. 4 which illustrates a situation at a timing after the situation illustrated in (A) of FIG. 4, because the vehicle 1 is traveling forward, the pedestrian is captured at a position 74 in a left region of the left-front imaging image 71 acquired by the left-front imaging device 16.

(C) of FIG. 4 is a diagram for describing a situation in which the pedestrian as the imaging target is captured in a front region of the left-rear imaging image 72 involving a shift, immediately after the situation illustrated in (B) of FIG. 4.

In (C) of FIG. 4 which illustrates a situation at a timing after the situation illustrated in (B) of FIG. 4, not the left-front imaging device 16 but the left-rear imaging device 17 performs imaging of the pedestrian. The pedestrian is captured at a position 75 closer to the middle of the left-rear imaging image 72 obtained by the left-rear imaging device 17.

In (C) of FIG. 4, the position 75 of the image of the pedestrian included in the left-rear imaging image 72 obtained by the left-rear imaging device 17 is shifted in an upper-left direction from a position 76 where the image of the pedestrian is to be located if the left-rear imaging image 72 involves no shift. Such a shift may be caused by the shift of the left-rear imaging device 17.

As a result, the distance and the direction of the pedestrian obtained by means of the monocular process based on the left-rear imaging image 72 obtained by the left-rear imaging device 17 illustrated in (C) of FIG. 4 may be less accurate than those of the position 76 in the case involving no shift.

In addition, as illustrated in (A) and (B) of FIG. 4, the captured pedestrian moves in the left-front imaging image 71 obtained by the left-front imaging device 16 in a horizontal direction from right to left, and thereafter, suddenly appears in the left-rear imaging image 72 obtained by the left-rear imaging device 17 illustrated in (C) of FIG. 4. The distance and the direction of the pedestrian thus changes discontinuously when the pedestrian moves between the plurality of imaging images, i.e., the left-front imaging image 71 and the left-rear imaging image 72.

In the example embodiment, proposed may be a technique that makes it possible to prevent the above-described various issues from occurring easily even if the imaging range, the angle of view, etc. of the imaging devices 11 to 18 disposed on the traveling vehicle 1 are shifted due to a factor such as a change in attachment state or vibration.

In the example embodiment, proposed may be a technique that makes it possible to use the imaging devices 11 to 18 even if the imaging devices 11 to 18 are not directly attached to the vehicle body 2 having high rigidity. Avoiding attaching the imaging devices 11 to 18 directly to the vehicle body 2 having high rigidity allows for attachment of the imaging devices 11 to 18 at freely-chosen positions appropriate for imaging, etc.

As a result, the example embodiment makes it possible to secure or maintain reliability of the imaging devices 11 to 18 disposed on the vehicle 1 to perform imaging of the vehicle external environment of the vehicle 1.

Figure 5:
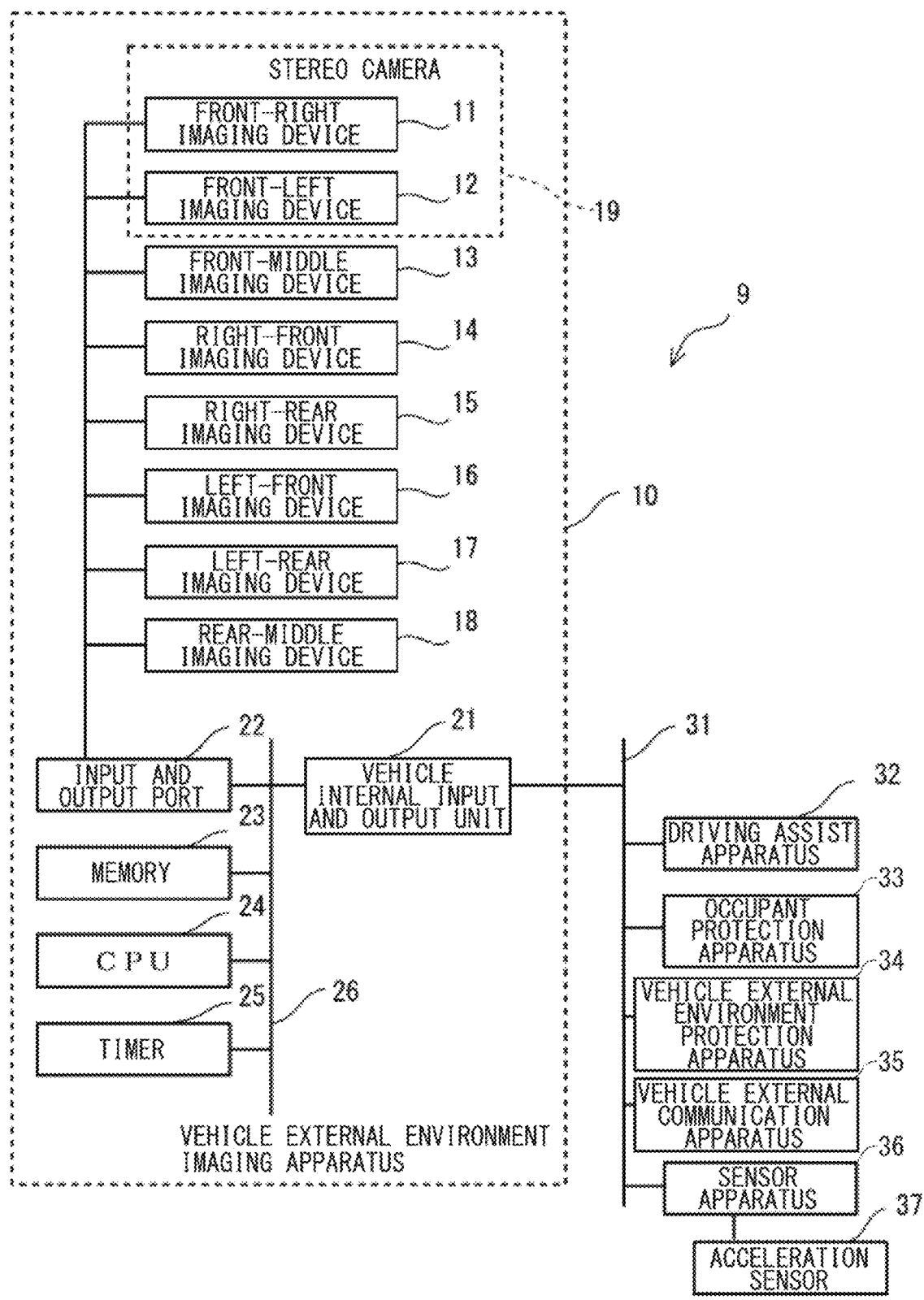
FIG. 5 is a diagram for describing an example of a control system including the vehicle external environment imaging apparatus of the vehicle illustrated in FIG. 1.

FIG. 5 is a diagram for describing a control system 9 of the vehicle 1 illustrated in FIG. 1. The control system 9 may include the vehicle external environment imaging apparatus 10.

The control system 9 illustrated in FIG. 5 may be included in a series of control systems of the vehicle 1. The control system 9 may include the vehicle external environment imaging apparatus 10, a driving assist apparatus 32, an occupant protection apparatus 33, a vehicle external environment protection apparatus 34, a vehicle external communication apparatus 35, and a sensor apparatus 36, and may also include a vehicle network 31 to which these apparatuses are coupled.

In one example, the vehicle network 31 may be a network to be employed in the vehicle 1, such as a controller area network (CAN), a local interconnect network (LIN), a local area network (LAN), a FlexRay, or a clock extension peripheral interface (CXPI). The vehicle network 31 may include, for example, bus cables to be coupled to control apparatuses and a central gateway (CGW) to which the bus cables are coupled in a bus coupling manner. The control apparatuses may be able to mutually transmit and receive messages via the vehicle network 31, and thus be able to coordinate with each other to control the vehicle 1.

The driving assist apparatus 32 may control, for example, unillustrated apparatuses including a steering apparatus, a drive apparatus, and a brake apparatus of the vehicle 1 to thereby control traveling of the vehicle 1. In one example, the drive apparatus may include an engine that generates driving force by means of combustion of a fuel such as gasoline, light oil, or hydrogen gas. In another example, the drive apparatus may include a motor that generates driving force by means of electric power accumulated in a battery or electric power generation. In still another example, the drive apparatus may include both the above-described engine and the above-described motor. In one example, the driving assist apparatus 32 may control traveling of the vehicle 1 in accordance with an operation performed by the occupant of the vehicle 1. In another example, the driving assist apparatus 32 may control the traveling of the vehicle 1 by assisting the operation performed by the occupant. In still another example, the driving assist apparatus 32 may control the traveling of the vehicle 1 by an autonomous automated driving control.

The occupant protection apparatus 33 may control unillustrated apparatuses to be used to protect the occupant of the vehicle 1, and execute a control directed to protecting of the occupant of the vehicle 1. Examples of the apparatuses to be used to protect the occupant of the vehicle 1 may include an airbag apparatus and a seat belt apparatus. In one example, the occupant protection apparatus 33 may execute the control directed to protecting the occupant of the vehicle 1 on the basis of detection or prediction of a contact caused on the vehicle 1.

The vehicle external environment protection apparatus 34 may control unillustrated apparatuses to be used to protect a pedestrian, a cyclist, or any other person around the vehicle 1, and execute a control directed to protecting the pedestrian, the cyclist, or any other person around the vehicle 1. Examples of the apparatuses to be used to protect the pedestrian, the cyclist, or any other person around the vehicle 1 may include an airbag apparatus. In one example, the vehicle external environment protection apparatus 34 may execute the control directed to protecting the pedestrian, the cyclist, or any other person around the vehicle 1 on the basis of detection or prediction of a contact between the vehicle 1 and the pedestrian, the cyclist, or any other person around the vehicle 1.

The vehicle external communication apparatus 35 may establish a communication path with, for example, an unillustrated base station provided along a road, and execute data transmission and reception by means of wireless communication between the control system 9 and an unillustrated server apparatus coupled to the base station. The vehicle external communication apparatus 35 may thus be able to transmit information regarding a contact or any other information generated by the control system 9 of the vehicle 1 to the server apparatus outside the vehicle 1. In this case, the control system 9 of the vehicle 1 may be able to transmit the information regarding a contact or any other information generated by the control system 9 of the vehicle 1 to the server apparatus outside the vehicle 1.

In one example, the vehicle external communication apparatus 35 may establish a communication path with another movable body such as another vehicle traveling around the vehicle 1. In this case, the control system 9 of the vehicle 1 may be able to transmit the information regarding a contact or any other information generated by the control system 9 of the vehicle 1 to the other movable body and receive information regarding traveling or any other information from the other movable body.

The sensor apparatus 36 may be coupled to various sensors provided on the vehicle 1, such as an acceleration sensor 37. The acceleration sensor 37 may detect an acceleration during the traveling of the vehicle 1. In one example, the sensor apparatus 36 may generate information regarding, for example, a traveling direction, a traveling speed, and an attitude of the vehicle 1 on the basis of a detection value of the acceleration sensor 37.

The vehicle external environment imaging apparatus 10 may include the imaging devices 11 to 18, an input and output port 22, and a vehicle internal input and output unit 21, a timer 25, a memory 23, and a central processing unit (CPU) 24, and also include a system bus 26 which these components are coupled to.

Each of the units of the vehicle external environment imaging apparatus 10 may supply and receive data to and from each other via the system bus 26. In one embodiment, the CPU 24 may serve as a "controller".

The imaging devices 11 to 18 are not particularly limited as long as the imaging devices 11 to 18 are able to be disposed on the vehicle 1 to perform imaging of the vehicle external environment of the vehicle 1, and may be those illustrated in FIG. 1.

In the example embodiment, the front-middle imaging device 13 illustrated in FIG. 1 may be so disposed that at least a portion of the imaging region of the angle-of-view range Rfc thereof is overlapped with the imaging region of the angle-of-view range Rfr of the front-right imaging device 11 and the imaging region of the angle-of-view range Rfl of the front-left imaging device 12.

The angle-of-view range Rrf of the right-front imaging device 14 may be so provided that a left portion of the imaging region thereof is overlapped with the imaging region of the angle-of-view range Rfr of the front-right imaging device 11 and the imaging region of the angle-of-view range Rfl of the front-left imaging device 12. The angle-of-view range Rrf of the right-front imaging device 14 may also be so provided that a left portion of the imaging region thereof is overlapped with the imaging region of the angle-of-view range Rfc of the front-middle imaging device 13.

The angle-of-view range Rrr of the right-rear imaging device 15 may be so provided that a left portion of the imaging region thereof is overlapped with the imaging region of the angle-of-view range Rrf of the right-front imaging device 14.

The angle-of-view range Rlf of the left-front imaging device 16 may be so provided that a right portion of the imaging region thereof is overlapped with the imaging region of the angle-of-view range Rfr of the front-right imaging device 11 and the imaging region of the angle-of-view range Rfl of the front-left imaging device 12. The angle-of-view range Rlf of the left-front imaging device 16 may also be so provided that a right portion of the imaging region thereof is overlapped with the imaging region of the angle-of-view range Rfc of the front-middle imaging device 13.

The angle-of-view range Rlr of the left-rear imaging device 17 may be so provided that a right portion of the imaging region thereof is overlapped with the imaging region of the angle-of-view range Rlf of the left-front imaging device 16.

The angle-of-view range Rrc of the rear-middle imaging device 18 may be so provided that a left portion of the imaging region thereof is overlapped with the imaging region of the angle-of-view range Rrr of the right-rear imaging device 15. The angle-of-view range Rrc of the rear-middle imaging device 18 may also be so provided that a right portion of the imaging region thereof is overlapped with the imaging region of the angle-of-view range Rlr of the left-rear imaging device 17.

The imaging devices 11 to 18 may be coupled to the input and output port 22. The imaging devices 11 to 18 may supply the imaging images periodically obtained by themselves to the input and output port 22.

The vehicle internal input and output unit 21 may be coupled to the vehicle network 31. The vehicle internal input and output unit 21 may supply and receive messages including data with another apparatus included in the control system 9, such as the driving assist apparatus 32, via the vehicle network 31.

The timer 25 may measure a time period and time. The time measured by the timer 25 may be corrected by means of a radio wave from a satellite of an unillustrated global navigation satellite system (GNSS). A GNSS receiver receiving the radio wave from the GNSS satellite may be coupled to the vehicle network 31, or may be coupled to the sensor apparatus 36.

The memory 23 may include, for example, a hard disk drive (HDD), an SD, a random-access memory (RAM), and a read-only memory (ROM). The memory 23 may allow for recording of, for example, a program to be executed by the CPU 24 and data such as a table to be used upon executing a program. The memory 23 may allow for recording of, for example, a table regarding distances and directions of respective pixels in the road surface model 55 illustrated in FIG. 2C.

The CPU 24 may read the program recorded in the memory 23 and execute the program. The CPU 24 may thus serve as a controller of the vehicle external environment imaging apparatus 10.

The CPU 24 serving as the controller of the vehicle external environment imaging apparatus 10 may control general operation of the vehicle external environment imaging apparatus 10.

For example, upon acquiring the imaging image from each of the imaging devices 11 to 18 via the input and output port 22, the CPU 24 may recognize and identify a nearby object such as a pedestrian on the basis of the acquired imaging image.

The CPU 24 may generate information regarding a relative distance or a relative direction of the nearby object identified as an imaging target in the vehicle external environment, with use of the respective imaging images obtained by the imaging devices 11 to 18.

The CPU 24 may supply the information generated regarding the identified nearby object to other apparatuses included in the control system 9 via the vehicle internal input and output unit 21 and the vehicle network 31.

In one example, the CPU 24 may appropriately execute a calibration control directed to correcting a shift related to each of the imaging devices 11 to 18 of the vehicle external environment imaging apparatus 10 on an as-needed basis.

Figure 6:
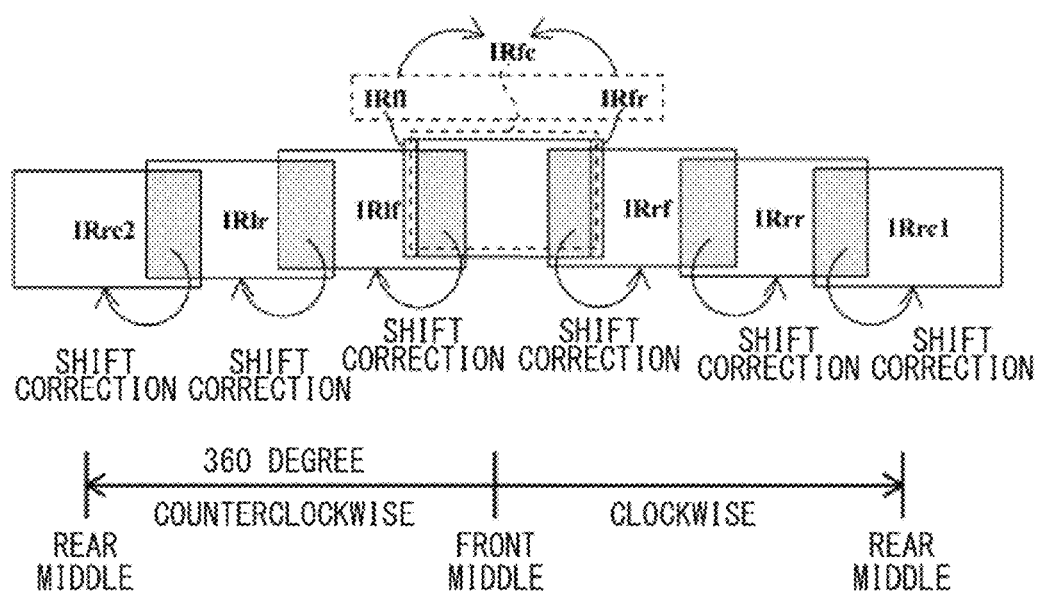
FIG. 6 is a diagram for describing examples of respective imaging ranges of the imaging devices illustrated in FIG. 5 and the order to perform a shift correction control.

FIG. 6 is a diagram for describing the respective imaging ranges of the imaging devices 11 to 18 illustrated in FIG. 5, and the order to perform a shift correction control in 360-degree calibration.

FIG. 6 illustrates the respective imaging images obtained by the imaging devices 11 to 18 illustrated in FIG. 1.

The imaging images may be disposed side by side with their imaging ranges being mutually overlapped. An imaging image IRfc obtained by the front-middle imaging device 13 of the vehicle 1 may be disposed in the middle.

In a middle portion of FIG. 6, the imaging image IRfc obtained by the front-middle imaging device 13, an imaging image IRfr obtained by the front-right imaging device 11, and an imaging image IRfl obtained by the front-left imaging device 12 are illustrated in such a manner that substantially all of the imaging regions thereof are overlapped with each other.

In a right portion of FIG. 6, an imaging image IRrf obtained by the right-front imaging device 14, an imaging image IRrr obtained by the right-rear imaging device 15, and an imaging image IRrc1 obtained by the rear-middle imaging device 18 are illustrated in order from the middle in such a manner that the imaging regions thereof are partially overlapped with each other.

In a left portion of FIG. 6, an imaging image IRlf obtained by the left-front imaging device 16, an imaging image IRlr obtained by the left-rear imaging device 17, and an imaging image IRrc2 obtained by the rear-middle imaging device 18 are illustrated in order from the middle in such a manner that the imaging regions thereof are partially overlapped with each other.

As described above, the imaging devices 11 to 18 illustrated in FIG. 1 may perform imaging clockwise from a front-middle region of the vehicle 1 to a rear-middle region of the vehicle 1, and perform imaging counterclockwise from the front-middle region of the vehicle 1 to the rear-middle region of the vehicle 1.

The imaging devices 11 to 18 illustrated in FIG. 1 may be able to perform imaging of respective divided regions into which a 360-degree region surrounding the vehicle 1 is divided. Accordingly, a nearby object, such as a pedestrian, present in the region surrounding the vehicle 1 may be possibly captured by at least one of the imaging devices 11 to 18.

Note that, regarding FIG. 6, the positional difference in the upper-lower direction among the imaging images is for easier viewing and description of the drawing. Therefore, the imaging ranges of the imaging images may be disposed side by side along an outer circumferential direction of the vehicle 1 basically without having the positional difference in the upper-lower direction of the vehicle 1.

Figure 7:
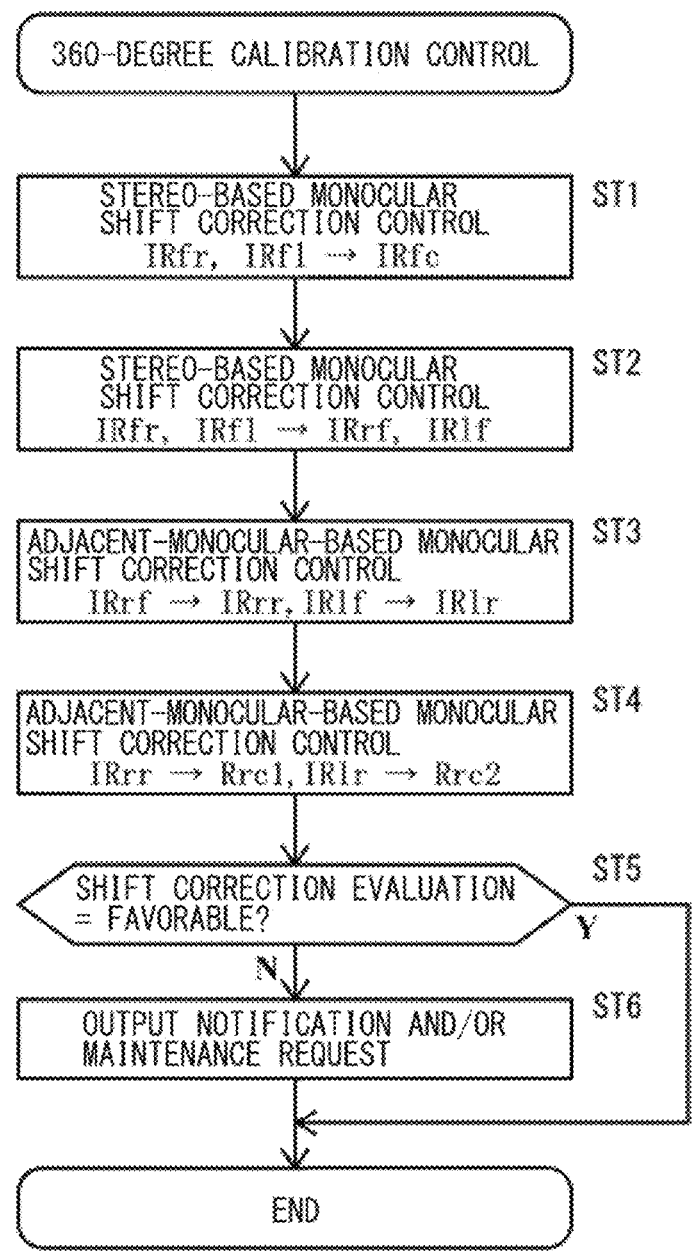
FIG. 7 is a flowchart illustrating an example of a 360-degree calibration control to be performed by a CPU illustrated in FIG. 5.

FIG. 7 is a flowchart of a 360-degree calibration control to be executed by the CPU 24 of the vehicle external environment imaging apparatus 10 illustrated in FIG. 5.

The 360-degree calibration control illustrated in FIG. 7 may use, as initial reference images, the imaging image IRfr obtained by the front-right imaging device 11 and the imaging image IRlr obtained by the front-left imaging device 12 that are usable in the compound-eye process related to the stereo camera 19, and thereby generate shift correction information to be used in the monocular process related to each of the rest of the imaging devices, i.e., the imaging devices 13 to 18. Further, the 360-degree calibration control illustrated in FIG. 7 may sequentially generate the respective pieces of shift correction information for the imaging images clockwise and counterclockwise in order from the imaging image IRfc in the middle of FIG. 6.

In one example, the shift correction information to be generated here may be usable, in the monocular process performed on the imaging image obtained by each of the imaging devices, to obtain a relative distance or a relative direction of an imaging target, such as a nearby object, in the vehicle external environment based on an imaging position in the imaging range.

In this case, the shift correction information may be correction information regarding a distance or a direction regarding information regarding a relative distance or a relative direction for each pixel (each imaging position) in the imaging image set in advance, for example, upon designing, for the monocular process related to the imaging image obtained by each of the imaging devices.

In one example, the CPU 24 of the vehicle external environment imaging apparatus 10 may repeatedly execute the 360-degree calibration control illustrated in FIG. 7.

In one example, the CPU 24 may execute all of the plurality of processes of the 360-degree calibration control illustrated in FIG. 7 at once. In another example, the CPU 24 may execute a process for the imaging image obtained by one of the imaging devices, and sometime later, separately execute a process for the imaging image obtained by another one of the imaging devices.

In one example, the CPU 24 may periodically execute the calibration control illustrated in FIG. 7. However, this is non-limiting. In another example, the CPU 24 may appropriately execute the calibration control illustrated in FIG. 7, for example, when the vehicle body 2 receives an impact, when the vehicle 1 starts traveling, when the vehicle 1 is manufactured and shipped, or when the vehicle 1 undergoes a vehicle check.

In each of the processes of the shift correction control illustrated in FIG. 7, the CPU 24 may generate the shift correction information only on the basis of a single imaging target in the latest imaging image at each process timing, i.e., the present timing. However, in one example, the CPU 24 may generate average shift correction information based on a plurality of imaging targets. In another example, the CPU 24 may generate average shift correction information based on a plurality of imaging targets in the imaging images obtained in a plurality of times of imaging. This leads to an expectation of a suppressed influence of a recognition error depending on the kind of the imaging target, a suppressed influence of an error due to imaging timings, etc., which in turn leads to an expectation of generation of more reliable shift correction information.

In step ST1, the CPU 24 may generate shift correction information to be used in a monocular process related to the front-middle imaging device 13, with use of, as a reference, the information regarding the relative distance and the relative direction of the imaging target in the vehicle external environment obtained by the compound-eye process related to the stereo camera 19 including the front-right imaging device 11 and the front-left imaging device 12 having a mutually-fixed arrangement. As illustrated in FIG. 6, the imaging region of the front-middle imaging device 13 may be overlapped with both the imaging regions of the front-right imaging device 11 and the front-left imaging device 12 serving as the stereo camera 19. Thus, at least three of the imaging devices may be so disposed on the vehicle 1 as to be able to perform duplicated imaging of a common imaging region.

The CPU 24 may recognize the imaging target in the vehicle external environment that is captured in all of the respective imaging images obtained by the three imaging devices. Further, the CPU 24 may generate information regarding a relative distance and a relative direction based on a parallax of the imaging target related to the stereo camera 19.

The CPU 24 may generate the shift correction information for the imaging image obtained by the front-middle imaging device 13 related to the process, with use of a difference between the relative distance and the relative direction based on the parallax related to the imaging target related to the stereo camera 19 and the relative distance and the relative direction based on the road pattern related to the front-middle imaging device 13.

In step ST2, as in step ST1, the CPU 24 may generate the shift correction information for the imaging image obtained by the right-front imaging device 14 for the monocular process, with use of, as a reference, the relative distance and the relative direction based on the parallax of the imaging target related to the stereo camera 19. A portion of the imaging region of the right-front imaging device 14 may be overlapped with the respective imaging regions of the front-right imaging device 11 and the front-left imaging device 12 forming the stereo camera 19. Therefore, a common imaging target is able to be captured in a duplicated manner in the imaging region common to the three imaging devices.

Further, as in step ST1, the CPU 24 may generate the shift correction information for the imaging image obtained by the left-front imaging device 16 for the monocular process, with use of, as a reference, the relative distance and the relative direction based on the parallax of the imaging target related to the stereo camera 19. A portion of the imaging region of the left-front imaging device 16 may be overlapped with the respective imaging regions of the front-right imaging device 11 and the front-left imaging device 12 forming the stereo camera 19. Therefore, the common imaging target is able to be captured in a duplicated manner in the imaging region common to the three imaging devices.

In step ST3, the CPU 24 may generate the shift correction information for the imaging image obtained by the right-rear imaging device 15, with use of, as a reference, the information regarding the relative distance and the relative direction of the imaging target in the vehicle external environment in a shift-corrected imaging image related to the right-front imaging device 14 for the monocular process. Upon such generation of the shift correction information for the imaging image obtained by the right-rear imaging device 15, the CPU 24 may utilize that a portion of the imaging image obtained by the right-rear imaging device 15 for the monocular process is overlapped with the imaging image obtained by the right-front imaging device 14 for the monocular process and a common imaging target is captured in a duplicated manner. The common imaging target is able to be captured in a duplicated manner in the overlapped imaging region common to the two imaging images.

In addition, the CPU 24 may generate the shift correction information for the imaging image obtained by the left-rear imaging device 17, with use of, as a reference, the information regarding the relative distance or the relative direction of the imaging target in the vehicle external environment in a shift-corrected imaging image related to the left-front imaging device 16 for the monocular process. Upon such generation of the shift correction information for the imaging image obtained by the left-rear imaging device 17, the CPU 24 may utilize that a portion of the imaging image obtained by the left-rear imaging device 17 for the monocular process is overlapped with the imaging image obtained by the left-front imaging device 16 for the monocular process and a common imaging target is captured in a duplicated manner. The common imaging target is able to be captured in a duplicated manner in the overlapped imaging region common to the two imaging images.

In step ST4, the CPU 24 may generate the shift correction information for the imaging image obtained by the rear-middle imaging device 18, with use of, as a reference, the information regarding the relative distance or the relative direction of the imaging target in the vehicle external environment in a shift-corrected imaging image related to the right-rear imaging device 15 for the monocular process. Upon such generation of the shift correction information for the imaging image obtained by the rear-middle imaging device 18, the CPU 24 may utilize that a portion of the imaging image obtained by the rear-middle imaging device 18 for the monocular process is overlapped with the imaging image obtained by the right-rear imaging device 15 for the monocular process and a common imaging target is captured in a duplicated manner. The common imaging target is able to be captured in a duplicated manner in the overlapped imaging region common to the two imaging images.

In addition, the CPU 24 may generate the shift correction information for the imaging image obtained by the rear-middle imaging device 18, with use of, as a reference, the information regarding the relative distance or the relative direction of the imaging target in the vehicle external environment in a shift-corrected imaging image related to the left-rear imaging device 17 for the monocular process. Upon such generation of the shift correction information for the imaging image obtained by the rear-middle imaging device 18, the CPU 24 may utilize that a portion of the imaging image obtained by the rear-middle imaging device 18 for the monocular process is overlapped with the imaging image obtained by the left-rear imaging device 17 for the monocular process and a common imaging target is captured in a duplicated manner. The common imaging target is able to be captured in a duplicated manner in the overlapped imaging region common to the two imaging images.

Note that in a case of obtaining only the shift correction information related to the rear-middle imaging device 18 for the monocular process, the CPU 24 may generate only one of the above-described two pieces of shift correction information.

As described above, upon generating the respective pieces of shift correction information related to the imaging devices 13 to 18 for the monocular process, the CPU 24 serving as a controller may use, as a reference, the respective imaging images obtained by the two imaging devices 11 and 12 to be used in the compound-eye process related to the stereo camera 19 including the imaging devices having the mutually-fixed arrangement, and may sequentially generate the pieces of shift correction information in order from the imaging devices 13 to 15 for the monocular process that are each able to perform duplicated imaging of the imaging region common to the stereo camera 19 and the imaging device itself.

Moreover, each of the imaging devices 14 to 18 for the monocular process so disposed on the vehicle 1 as to perform imaging of the respective divided regions of the 360-degree region surrounding the vehicle 1 may be so disposed on the vehicle 1 as to be able to perform duplicated imaging of the imaging region common to the imaging device itself and another imaging device for the monocular process adjacent thereto in a direction in which the 360-degree region surrounding the vehicle 1 is divided. The shift correction information for each of such imaging devices 14 to 18 may be generated with use of, as a reference, the imaging position in the shift-corrected imaging image related to the other imaging device for the monocular process adjacent thereto. The CPU 24 may sequentially generate the pieces of shift correction information each regarding the relative distance and the relative direction of the imaging target in the vehicle external environment based on the imaging position in the imaging range to be used in the monocular process related to one of the imaging devices 13 to 18 for the monocular process, in accordance with the order of overlapping of the imaging region. The CPU 24 may be able to generate the pieces of shift correction information related to the imaging devices 14 to 18 for the monocular process that perform imaging of the respective divided regions into which the 360-degree region surrounding the vehicle 1 is divided, in order from the imaging device 14 for the monocular process and the imaging device 16 for the monocular process. The imaging device 14 for the monocular process may be the imaging device for the monocular process on a first end side that is able to perform duplicated imaging of the imaging region common to the imaging device 14 and the stereo camera 19 on the first end side of the imaging range of the stereo camera 19. The imaging device 16 for the monocular process may be the imaging device for the monocular process on a second end side that is able to perform duplicated imaging of the imaging region common to the imaging device 16 and the stereo camera 19 on the second end side of the imaging range of the stereo camera 19.

Further, the rear-middle imaging device 18 for which the shift correction process is to be performed last may be so disposed as to perform imaging of the rear region of the vehicle 1 which is the opposite side of the region of which the stereo camera 19 performs imaging. The CPU 24 may generate clockwise shift correction information and counterclockwise shift correction information in relation to the rear-middle imaging device 18 for the monocular process which is to be processed last.

In step ST5, the CPU 24 may evaluate whether the pieces of shift correction information related to the imaging devices 13 to 18 for the monocular process generated by the above-described processes allow for obtaining of reliable information regarding the relative distance and the relative direction of the nearby object in the vehicle external environment.

In one example, the CPU 24 may evaluate a series of corrections by comparing the clockwise shift correction information (on the first end side) and the counterclockwise shift correction information (on the second end side) related to the rear-middle imaging device 18 for which the shift correction process is performed last.

In a case where the series of corrections are enough favorable to obtain reliable information regarding the relative distance and the relative direction by the monocular process, the CPU 24 may end this control. In a case where the series of corrections cannot be evaluated as favorable, the CPU 24 may cause the process to proceed to step ST6.

In step ST6, the CPU 24 may output a notification communicating a possibility of not being able to obtain highly reliable information regarding the distance or the direction of the nearby object present around the vehicle 1 in the vehicle external environment on the basis of the respective imaging images obtained by the imaging devices 13 to 18. The notification may be provided to an occupant by means of an unillustrated speaker or an unillustrated user interface such as a liquid crystal device provided on the vehicle 1.

In addition, the CPU 24 may output a maintenance request regarding, for example, the attachment of the imaging devices 11 to 18. Information regarding the maintenance request may be supplied to the vehicle external communication apparatus 35 via the vehicle internal input and output unit 21 and the vehicle network 31. The vehicle external communication apparatus 35 may transmit the maintenance request to an unillustrated server apparatus of a company in charge of maintenance and checking of the vehicle 1.

Thereafter, the CPU 24 may end this control.

In one embodiment, the rear-middle imaging device 18 may serve as a "last monocular-process imaging device".

Figure 8:
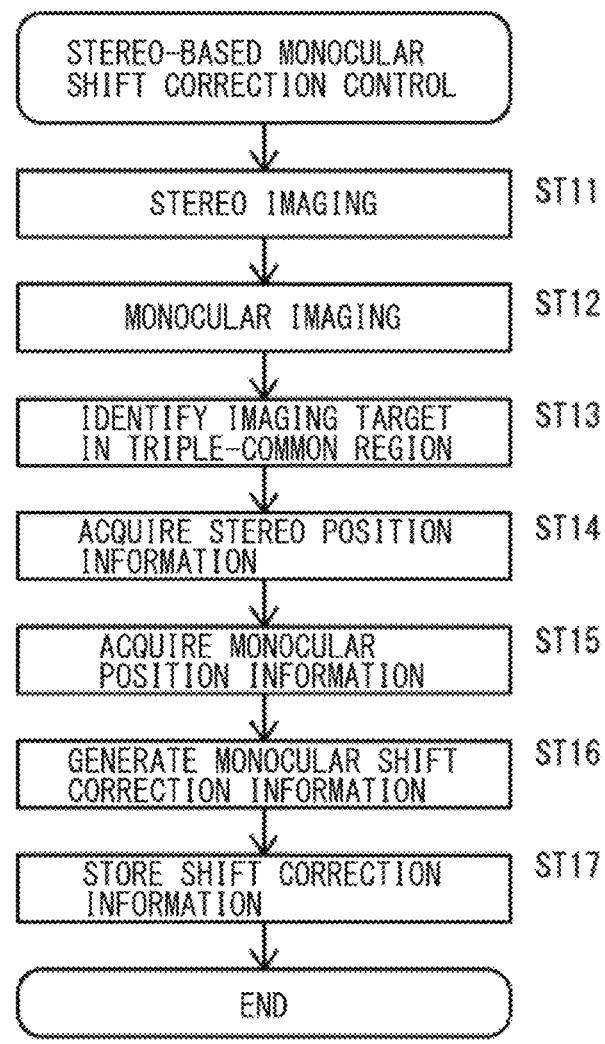
FIG. 8 is a detailed flowchart illustrating an example of a stereo-based monocular shift correction control.

FIG. 8 is a detailed flowchart of a stereo-based monocular shift correction control.

For example, the CPU 24 may execute the stereo-based monocular shift correction control illustrated in FIG. 8 in each of a case of generating the shift correction information related to the front-middle imaging device 13 in step ST1 in FIG. 7, a case of generating the shift correction information related to the right-front imaging device 14 in step ST2 in FIG. 7, and a case of generating the shift correction information related to the left-front imaging device 16 in step ST2 in FIG. 7.

In step ST11, the CPU 24 may acquire two imaging images by stereo imaging performed by the front-right imaging device 11 and the front-left imaging device 12 having the mutually-fixed arrangement.

In step ST12, the CPU 24 may acquire an imaging image by monocular imaging performed by any of the imaging devices 13, 14, and 16 related to the shift correction process.

In step ST13, the CPU 24 may identify an imaging target such as a nearby object in a triple-common imaging region, i.e., an imaging region common to all of the three imaging images acquired in steps ST11 and ST12. In one example, the CPU 24 may extract a common image component included in the triple-common imaging region to identify the imaging target such as the nearby object. Note that the attachment position, with respect to the vehicle body 2, of the imaging device 13, 14, or 16 related to the shift correction process may possibly be shifted or inclined. In one example, the CPU 24 may take into consideration the shift correction in a previous process to correct such shift or inclination, and may identify the imaging target such as the nearby object, for example, in a range smaller than the imaging region of the traveling lane as illustrated in FIG. 6.

In step ST14, the CPU 24 may acquire, as stereo position information, the relative distance and the relative direction of the identified imaging target obtained by the compound-eye process related to the stereo camera 19. In one example, the CPU 24 may acquire the relative distance and the relative direction based on the parallax of the identified imaging target by a method such as trigonometry calculation on the basis of the two imaging images that have not yet undergone the shift correction related to the stereo camera 19.

In step ST15, the CPU 24 may acquire, as monocular position information, the relative distance and the relative direction of the identified imaging target obtained by the monocular process related to the imaging device related to the shift correction. In one example, the CPU 24 may acquire the relative distance and the relative direction of the identified imaging target on the basis of the road pattern not involving the shift correction related to the imaging image obtained by the imaging device 13, 14, or 16 related to the shift correction process.

In step ST16, the CPU 24 may generate the shift correction information to be used in the monocular process related to the imaging device 13, 14, or 16 related to the shift correction process. In one example, the CPU 24 may generate, as the shift correction information, information regarding a difference between the distance and the direction of the imaging target in the stereo position information and the distance and the direction of the imaging target in the monocular position information. As illustrated in FIG. 3A, the imaging device 13, 14, or 16 related to the shift correction process may sometimes involve a rotational shift other than a horizontal shift and a vertical shift. In a case where at least the rotational shift is involved, the CPU 24 may generate, as the shift correction information, the shift correction information individually for each of all the pixels of the imaging device 13, 14, or 16 related to the shift correction process.

In step ST17, the CPU 24 may associate the generated shift correction information with the imaging device 13, 14, or 16 related to the shift correction process and store the associated shift correction information in the memory 23.

Thus, the CPU 24 may identify the imaging position of the imaging target, which is captured in a duplicated manner in the triple-common imaging region, in each of the imaging images of the three imaging devices, i.e., the two imaging devices 11 and 12 of the stereo camera 19 and the imaging device 13, 14, or 16 related to the shift correction process. The CPU 24 may be able to generate the shift correction information to be used in the monocular process related to the imaging device 13, 14, or 16 related to the shift correction process, on the basis of a difference in the imaging position among the three imaging images. The CPU 24 may be able to generate, with use of the information regarding the relative distance and the relative direction related to the stereo camera 19, the shift correction information regarding the relative distance and the relative direction of the imaging target in the vehicle external environment based on the imaging position, which is to be used in the monocular process of each of the imaging devices 13, 14, and 16 for the monocular process.

Figure 9:
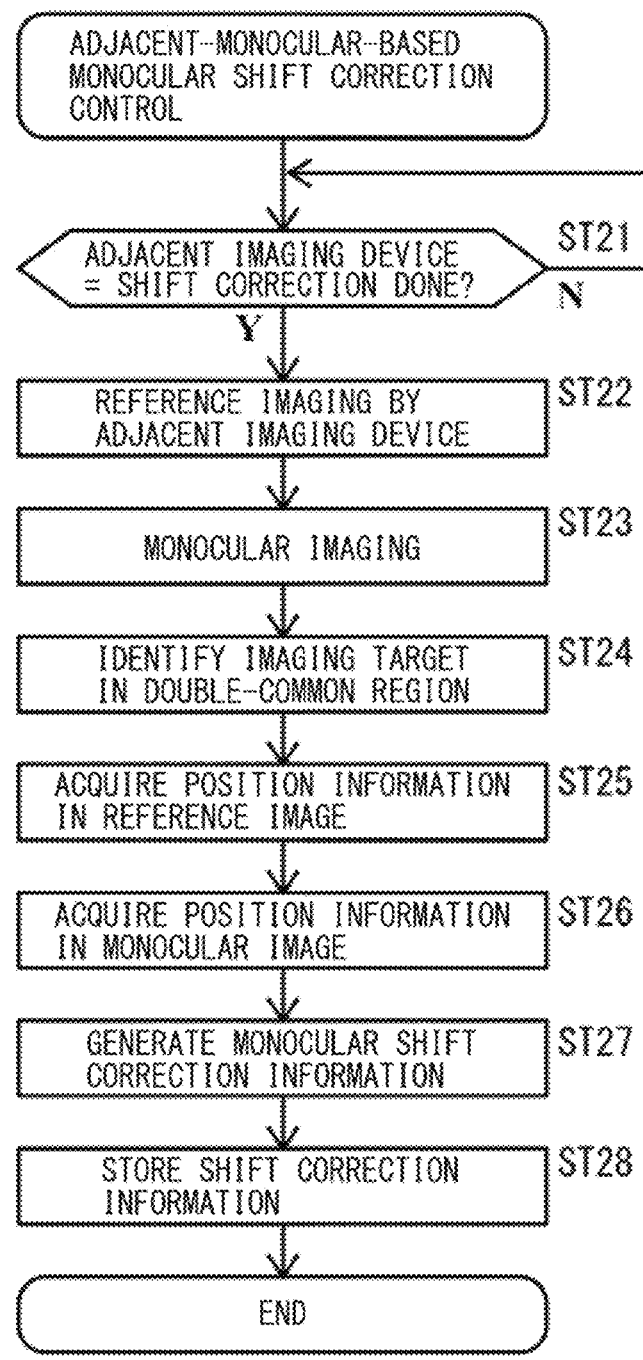
FIG. 9 is a detailed flowchart illustrating an example of an adjacent-monocular-based monocular shift correction control.

FIG. 9 is a detailed flowchart of an adjacent-monocular-based monocular shift correction control.

For example, the CPU 24 may execute the adjacent-monocular-based monocular shift correction control illustrated in FIG. 9 in each of a case of generating the shift correction information related to the right-rear imaging device 15 in step ST3 in FIG. 7, a case of generating the shift correction information related to the left-rear imaging device 17 in step ST3 in FIG. 7, and a case of generating the shift correction information related to the rear-middle imaging device 18 in step ST3 in FIG. 7.

In step ST21, the CPU 24 may determine whether the shift correction process related to each of the imaging devices 14, 16, and 15 (and also 17, if necessary) adjacent to the imaging devices 15, 17, and 18 related to the process has been already executed. In a case where the shift correction process related to each of the adjacent imaging devices 14, 16, and 15 (and also 17, if necessary) has not been executed yet, the CPU 24 may repeat the process in step ST21. In a case where the shift correction process related to each of the adjacent imaging devices 14, 16, and 15 (and also 17, if necessary) has been already executed, the CPU 24 may cause the process to proceed to step ST22.

In step ST22, the CPU 24 may acquire one imaging image, to be used as a reference, by monocular imaging performed by the adjacent imaging device 14, 16, or 15 (or 17, if necessary) for which the shift correction process has been already executed.

In step ST23, the CPU 24 may acquire an imaging image by monocular imaging performed by the imaging device 15, 17, or 18 related to the shift correction process.

In step ST24, the CPU 24 may identify an imaging target such as a nearby object in a double-common imaging region, i.e., an imaging region common to the two imaging images acquired in steps ST22 and ST23. In one example, the CPU 24 may extract a common image component included in the double-common imaging region to identify the imaging target such as the nearby object. Note that the attachment position, with respect to the vehicle body 2, of the imaging device 15, 17, or 18 related to the shift correction process may each possibly be shifted or inclined. In one example, the CPU 24 may take into consideration the shift correction in a previous process to correct such shift or inclination, and may identify the imaging target such as the nearby object, for example, in a range smaller than the imaging region of the traveling lane as illustrated in FIG. 6.

In step ST25, the CPU 24 may acquire, as position information in the reference image, the relative distance and the relative direction of the identified imaging target in the reference image. In one example, the CPU 24 may acquire the relative distance and the relative direction of the identified imaging target on the basis of a road pattern involving the shift correction related to the reference image of the adjacent imaging device 14, 16, or 15 (or 17, if necessary).

In step ST26, the CPU 24 may acquire, as monocular position information, the relative distance and the relative direction of the identified imaging target obtained by the monocular process related to the imaging device 15, 17, or 18 related to the shift correction process. In one example, the CPU 24 may acquire the relative distance and the relative direction of the identified imaging target on the basis of the road pattern not involving the shift correction related to the imaging image obtained by the imaging device 15, 17, or 18 related to the shift correction process.

In step ST27, the CPU 24 may generate the shift correction information to be used in the monocular process related to the imaging device 15, 17, or 18 related to the shift correction process. In one example, the CPU 24 may generate, as the shift correction information, information regarding a difference between the distance and the direction of the imaging target in the reference image and the distance and the direction of the imaging target in the monocular image. As illustrated in FIG. 3A, the imaging device 15, 17, or 18 related to the shift correction process may sometimes involve a rotational shift other than a horizontal shift and a vertical shift. In a case where the rotational shift is involved, the CPU 24 may generate the shift correction information, individually for each of all the pixels of the imaging device 15, 17, or 18 related to the shift correction process.

In step ST28, the CPU 24 may associate the generated shift correction information with the imaging device 15, 17, or 18 related to the shift correction process and store the associated shift correction information in the memory 23.

Thus, the CPU 24 may identify the imaging position of the imaging target, which is captured in a duplicated manner in the double-common imaging region, in each of the imaging images of the two imaging devices, i.e., the imaging device 15, 17, or 18 related to the shift correction process and corresponding one of the imaging devices 14, 16, and 15 (and also 17, if necessary) adjacent thereto. The CPU 24 may be able to generate the shift correction information to be used in the monocular process related to the imaging device 15, 17, or 18 related to the shift correction process, on the basis of a difference in the imaging position between the two imaging images. The CPU 24 may be able to generate, with use of the information regarding the relative distance or the relative direction related to the imaging device 14, 16, or 15 (or 17, if necessary) for which the shift correction information has already been generated, the shift correction information regarding the relative distance and the relative direction of the imaging target in the vehicle external environment based on the imaging position which is to be used in the monocular process of the imaging device 15, 17, or 18 for the monocular process.

Figure 10:
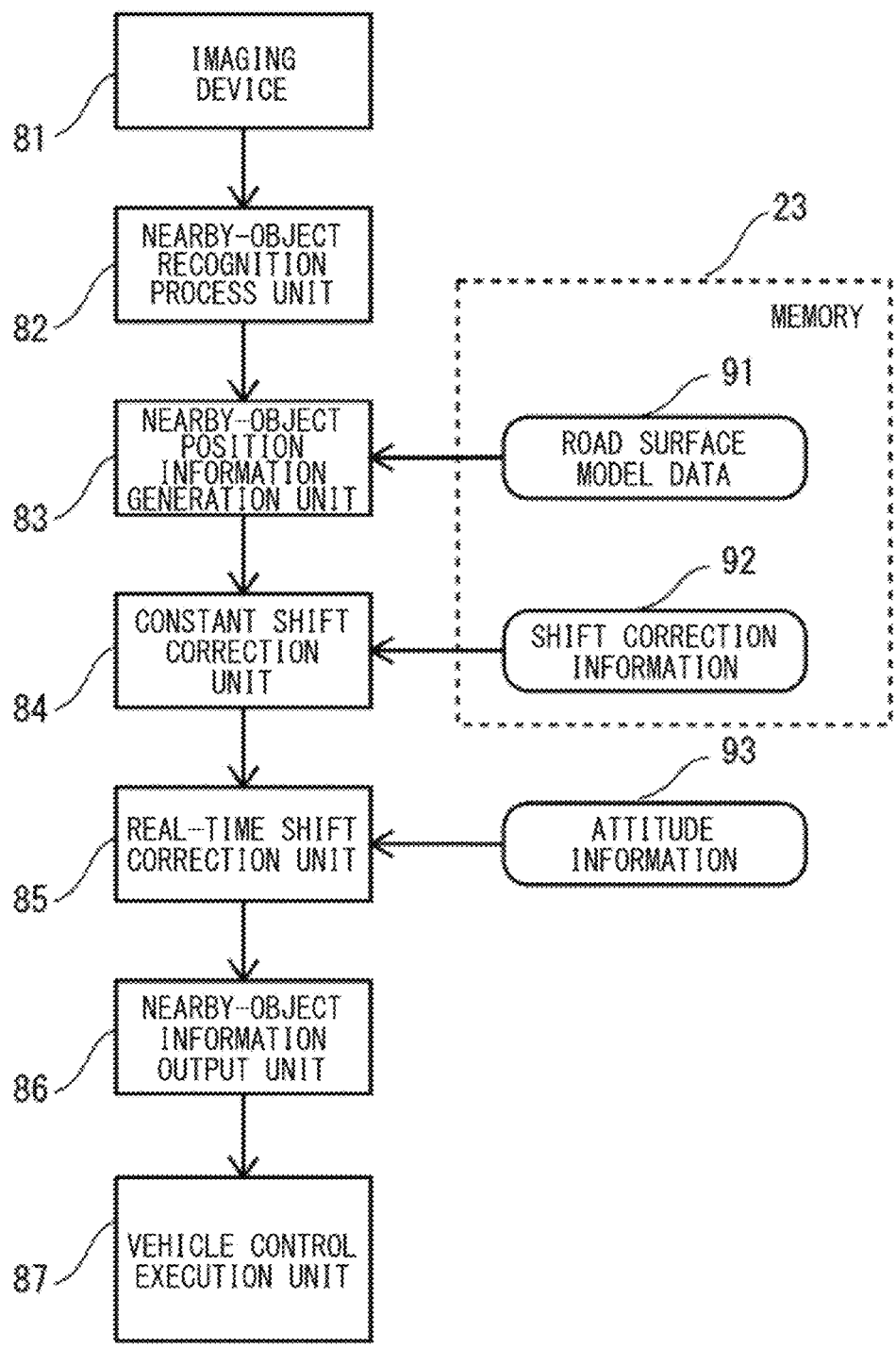
FIG. 10 is a block diagram illustrating an example of an imaging control using shift correction information generated by the controls illustrated in FIGS. 7 to 9.

FIG. 10 is a block diagram for describing an imaging control using the pieces of shift correction information generated by the respective controls illustrated in FIGS. 7 to 9.

The CPU 24 may execute a program recorded in the memory 23 to thereby implement, in the vehicle external environment imaging apparatus 10, a nearby-object recognition process unit 82, a nearby-object position information generation unit 83, a constant shift correction unit 84, a real-time shift correction unit 85, and a nearby-object information output unit 86 illustrated in FIG. 10.

FIG. 10 also illustrates a single imaging device 81 and a vehicle control execution unit 87. The imaging device 81 may be used in the monocular process in the vehicle external environment imaging apparatus 10. The vehicle control execution unit 87 may execute a control based on nearby object information generated by the vehicle external environment imaging apparatus 10. The imaging device 81 may be, for example, any one selected from the front-middle imaging device 13, the right-front imaging device 14, the right-rear imaging device 15, the left-front imaging device 16, the left-rear imaging device 17, and the rear-middle imaging device 18.

The memory 23 of the vehicle external environment imaging apparatus 10 may hold road surface model data 91 that is able to be associated with the imaging image in the monocular process related to the imaging device 81, and shift correction information 92 for the imaging device 81 generated by the above-described processes.

In one example, the CPU 24 may implement the block of units related to the imaging control illustrated in FIG. 10 for each of the imaging devices 13 to 18 for the monocular process provided in the vehicle external environment imaging apparatus 10.

The imaging device 81 may perform imaging of the vehicle external environment of the vehicle 1, and supply an imaging image to the nearby-object recognition process unit 82.

The nearby-object recognition process unit 82 may execute, on the imaging image obtained by the imaging device 81, a nearby object recognition process, i.e., a process of recognizing a nearby object captured in the imaging image.

In one example, the nearby-object recognition process unit 82 may recognize another vehicle, a pedestrian, and a cyclist present around the vehicle 1 in the vehicle external environment that are captured in the imaging image by the nearby object recognition process. In one example, other than the above, the nearby-object recognition process unit 82 may also recognize an object such as a road, an object installed on a road, a structure along a road, and a lane line drawn on a road.

In one example, the nearby-object recognition process unit 82 may recognize the captured nearby object with use of characteristic information related to the nearby object recorded in advance in the memory 23 for each nearby object. In another example, the nearby-object recognition process unit 82 may recognize the captured nearby object by a deep learning network process which has learned about the nearby object. In still another example, the nearby-object recognition process unit 82 may recognize the captured nearby object by both the methods described above. In one example, the nearby-object recognition process unit 82 may convert the imaging image by means of resolution conversion, size conversion, color-component conversion, or a differential process, and execute the nearby object recognition process. In another example, the nearby-object recognition process unit 82 may cut out a portion of the imaging image, and execute the nearby object recognition process. In still another example, the nearby-object recognition process unit 82 may execute the nearby object recognition process by means of processes differing between regions of the imaging image.

The nearby-object position information generation unit 83 may generate position information for each of one or more nearby objects recognized by the nearby-object recognition process unit 82. The position information may include information regarding a relative distance and a relative direction.

In one example, the nearby-object position information generation unit 83 may use the road surface model data 91 regarding a pixel of the imaging position of the nearby object and recorded in the memory 23 for the monocular process, to thereby generate the position information including the information regarding the relative distance and the relative direction.

The constant shift correction unit 84 may execute a correction process of reducing a constant shift regarding the imaging device 81 included in the relative distance and the relative direction of the nearby object.

The constant shift correction unit 84 may acquire the shift correction information 92 recorded in the memory 23 in association with the imaging device 81, and correct the relative distance and the relative direction of the nearby object with use of the acquired shift correction information 92.

The CPU 24 may thereby be able to obtain, as the relative distance and the relative direction of the nearby object, a distance and a direction with a suppressed influence of the shift of the attached position of the imaging device 81.

The real-time shift correction unit 85 may acquire latest attitude information 93 of the vehicle 1, calculate the shift of the imaging device 81 caused by a change in the attitude of the vehicle 1, and execute a correction process of reducing the calculated shift.

In one example, the real-time shift correction unit 85 may acquire the latest attitude information 93 of the vehicle 1 based on detection of the acceleration sensor 37 from the sensor apparatus 36.

The real-time shift correction unit 85 may calculate the shift of the imaging device 81 with use of the acquired attitude information 93, the information regarding the vehicle body 2 of the vehicle 1, and information regarding the attachment position of the imaging device 81 on the vehicle 1. In one example, the information regarding the vehicle body 2 of the vehicle 1 and the information regarding the attachment position of the imaging device 81 on the vehicle 1 may be recorded as data in the memory 23, or may be recorded as parameters in a program. The road surface model may basically represent a relative distance and a relative direction corresponding to each pixel in the imaging state illustrated in FIG. 2A. The change in the attitude of the vehicle 1 may cause a change in a factor such as the height from the road surface or the direction of the imaging device 81. In one example, the real-time shift correction unit 85 may calculate a change amount of a factor such as the attitude or the distance of the imaging device 81 with respect to the road surface illustrated in FIG. 2A after the change in attitude of the vehicle 1, as a real-time shift of the imaging device 81.

The real-time shift correction unit 85 may correct the relative distance and the relative direction of the nearby object with use of the calculated change amount of the distance and the direction.

The CPU 24 may thereby be able to obtain, as the relative distance and the relative direction of the nearby object, a distance and a direction with a suppressed influence of the shift of the imaging device 81 caused by the change in the attitude of the vehicle 1.

The nearby-object information output unit 86 may supply the generated information regarding the recognized nearby object to each of the apparatuses in vehicle 1.

The relative distance and the relative direction of the nearby object included in the information regarding the nearby object to be supplied to each of the apparatuses in the vehicle 1 may have been corrected by the above-described correction process, and may have a suppressed influence of the shift of the attachment position of the imaging device 81 and a suppressed influence of the shift of the imaging device 81 caused by the change in the attitude of the vehicle 1. Accordingly, such relative distance and the relative direction of the nearby object are highly reliable.

The vehicle control execution unit 87 may execute a process depending on a traveling environment of the vehicle 1 with use of the information regarding the nearby object supplied by the nearby-object information output unit 86.

In one example, the vehicle control execution unit 87 may be the driving assist apparatus 32, the occupant protection apparatus 33, the vehicle external environment protection apparatus 34, or the vehicle external communication apparatus 35 illustrated in FIG. 5.

For example, the driving assist apparatus 32 may so control traveling of the vehicle 1 that the vehicle 1 travels avoiding the nearby object present around the vehicle 1, with use of the information regarding the distance and the direction of the nearby object supplied by the nearby-object information output unit 86.

The occupant protection apparatus 33 may predict or detect a contact between the traveling vehicle 1 and the nearby object present around the vehicle 1, with use of the information regarding the distance and the direction of the nearby object supplied by the nearby-object information output unit 86. In a case where the contact between the vehicle 1 and the nearby object is predicted or detected, the occupant protection apparatus 33 may execute an occupant protection control so that the impact caused by the contact between the vehicle 1 and the nearby object is absorbed. Such an occupant protection control may involve, for example, deployment of an airbag or application of tension to a seat belt.

The vehicle external environment protection apparatus 34 may predict or detect a contact between the traveling vehicle 1 and a pedestrian or a cyclist present around the vehicle 1, with use of the information regarding the distance and the direction of the nearby object supplied by the nearby-object information output unit 86. In a case where the contact between the vehicle 1 and the pedestrian or the cyclist is predicted or detected, the vehicle external environment protection apparatus 34 may execute a vehicle external environment protection control involving deployment of an airbag for the pedestrian or the cyclist. Providing the deployed airbag between the pedestrian or the cyclist and the vehicle body 2 of the vehicle 1 helps to prevent the pedestrian or the cyclist from coming into direct contact with the vehicle body 2 of the vehicle 1.

The vehicle external communication apparatus 35 may predict or detect a contact between the traveling vehicle 1 and the nearby object present around the vehicle 1, with use of the information regarding the distance and the direction of the nearby object supplied by the nearby-object information output unit 86. In a case where the contact between the vehicle 1 and the nearby object is predicted or detected, the vehicle external communication apparatus 35 may transmit information regarding the contact to a server apparatus of an emergency response organization. This allows a member of the emergency response organization to rush to the contact scene and start a rescue effort at an early timing.

Figure 11:
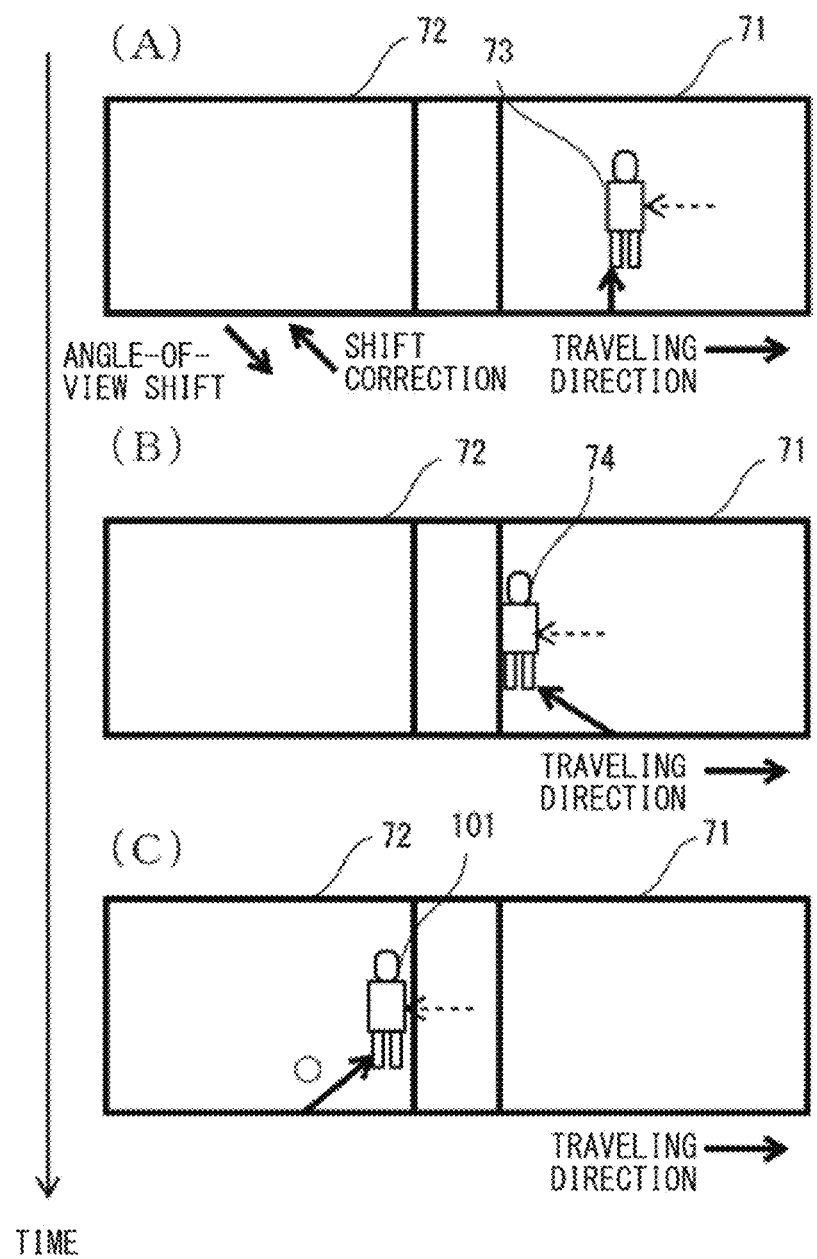
FIG. 11 is a schematic diagram for describing an example of a relative movement of an imaging target in imaging images obtained by two adjacent imaging devices derived from the process illustrated in FIG. 10.

FIG. 11 is a diagram for schematically describing a relative movement of the imaging target in the imaging images obtained by two mutually adjacent imaging devices in the process related to FIG. 10.

FIG. 11 illustrates imaging images obtained by the left-front imaging device 16 and the left-rear imaging device 17 which are the two imaging devices provided on the left side of the vehicle 1 traveling forward as in FIG. 4, but undergone shift correction. (A) to (C) of FIG. 11 illustrate respective imaging images obtained in this order of time.

In FIG. 11, the left-front imaging device 16 is provided at the reference position, while the left-rear imaging device 17 is provided to be shifted from the reference position in the lower-right direction.

(A) of FIG. 11 is a diagram for describing a situation in which the pedestrian as the imaging target is captured in a middle region of the left-front imaging image with the shift involved in the left-front imaging image being corrected.

In (A) of FIG. 11, the left-front imaging device 16, of the left-front imaging device 16 and the left-rear imaging device 17, performs imaging of the pedestrian. The pedestrian is captured in a middle region of the imaging image related to the left-front imaging device 16.

(B) of FIG. 11 is a diagram for describing a situation in which the pedestrian as the imaging target is captured in a rear region of the left-front imaging image immediately after the situation illustrated in (A) of FIG. 11.

In (B) of FIG. 11 which illustrates a situation at a timing after the situation illustrated in (A) of FIG. 11, because the vehicle 1 is traveling forward, the pedestrian is captured in a left region of the imaging image related to the left-front imaging device 16.

(C) of FIG. 11 is a diagram for describing a situation in which the pedestrian as the imaging target is captured in a front region of the left-rear imaging image with the shift being corrected, immediately after the situation illustrated in (B) of FIG. 11.

In (C) of FIG. 11 which illustrates a situation at a timing after the situation illustrated in (B) of FIG. 11, not the left-front imaging device 16 but the left-rear imaging device 17 performs imaging of the pedestrian. An image 101 of the pedestrian is captured at a position in a front region on the left side of the imaging image related to the left-rear imaging device 17.

In (C) of FIG. 11, because the shift related to the left-rear imaging device 17 is corrected, the position of the image of the pedestrian included in the imaging image related to the left-rear imaging device 17 is similar to a position thereof in a case where the left-rear imaging device 17 is not shifted.

As a result, the distance and the direction of the pedestrian obtained by means of the monocular process based on the imaging image related to the left-rear imaging device 17 illustrated in (C) of FIG. 11 is highly accurate.

In addition, the captured pedestrian who has been moving in the horizontal direction from right to left in the imaging image related to the left-front imaging device 16 as illustrated in (A) and (B) of FIG. 11 also moves in the horizontal direction from right to left while maintaining its speed in the imaging image related to the left-rear imaging device 17 as illustrated in (C) of FIG. 11. The distances and the directions of the image of the pedestrian in the respective imaging images are favorable as the moving speed and the moving direction are maintained among those imaging images also when the image of the pedestrian moves among those imaging images.

FIGS. 12A to 12D are diagrams for describing examples of a method of evaluating a shift correction.

The CPU 24 may evaluate shift corrections made in relation to the imaging devices 13 to 18, for example, in step ST5 illustrated in FIG. 7.

Upon such evaluation, in one example, the CPU 24 may execute evaluation based on the imaging target in the shift-corrected imaging images illustrated in FIGS. 12A and 12B, comparison evaluation between two shift-corrected imaging images capturing the rear region illustrated in FIG. 12C, comparison evaluation among a plurality of shift-corrected imaging images related to a plurality of monocular processes illustrated in FIG. 12D, or any other evaluation. In one example, in a case of executing two or more kinds of comparison evaluation, the CPU 24 may determine the final evaluation as favorable in a case where all kinds of the comparison evaluation are determined as favorable, and may determine the final evaluation as not favorable in other cases.

FIG. 12A is a diagram for describing a schematic shift-corrected imaging image 111 related to the rear-middle imaging device 18 and a method of evaluating thereof.

FIG. 12B is a diagram for describing a shift-corrected imaging image 112 which may possibly be determined as not favorable by the evaluation performed similarly for the case illustrated in FIG. 12A.

The shift-corrected imaging image 111 illustrated in FIG. 12A and the shift-corrected imaging image 112 illustrated in FIG. 12B each include a pair of left and right straight lane lines of the traveling lane on which the vehicle 1 is traveling.

In a process of evaluating the imaging images 111 and 112, the CPU 24 may execute a process such as an image analysis process as the nearby object recognition process, to thereby recognize and identify image components of the pair of left and right straight lane lines included in each of the shift-corrected imaging images 111 and 112.

The CPU 24 may evaluate, for example, the imaging position, the balance between left and right, etc. of the recognized image components of the pair of left and right lane lines in the shift-corrected imaging images 111 and 112.

In one example, the CPU 24 may evaluate the pair of image components included in the shift-corrected imaging images 111 and 112, by referring to information regarding a traveling state of the vehicle 1 at the time of imaging, for example, information regarding the traveling state such as a straight traveling state.

In a case where, as illustrated in FIG. 12A, the image components of the pair of left and right lane lines are included in a bilaterally symmetric state in the imaging range of the shift-corrected imaging image 111, the CPU 24 may evaluate the shift correction information as favorable.

In contrast, in a case where, as illustrated in FIG. 12B, the image components of the pair of left and right lane lines are included in a state shifted by a predetermined amount or more from the bilaterally symmetric state in the imaging range of the shift-corrected imaging image 112, the CPU 24 may not evaluate the shift correction information as favorable. Further, in a case where the shift correction information not being evaluated as favorable is, for example, related to the clockwise correction, the CPU 24 may select the shift correction information related to the counterclockwise correction as the shift correction information to be used in the process illustrated in FIG. 10.

Note that examples of image components that may possibly be included in a pair in the imaging image may include curbs and guardrails on the left and right sides of a road. Further, a line of a plurality of sign poles, utility poles, or traffic signals standing along a road may be recognizable as a track extending along the road on the basis of the image components. In addition, for example, a bridge over the road on which the vehicle 1 is traveling may possibly be included in the imaging images 111 and 112 as basically bilaterally symmetric image components. In one example, the CPU 24 may evaluate the imaging position, the balance between left and right, etc. in the shift-corrected imaging images 111 and 112, of such image components on the road included in the shift-corrected imaging images 111 and 112 related to the rear-middle imaging device 18.

FIG. 12C is a diagram for describing an evaluation method based on a schematic clockwise shift-corrected imaging image 113, obtained by the shift correction process performed in clockwise order, related to the rear-middle imaging device 18, and a schematic counterclockwise shift-corrected imaging image 114, obtained by the shift correction process performed in counterclockwise order, related to the rear-middle imaging device 18.

In a process of evaluating the imaging images, the CPU 24 may execute a process such as an image analysis process as the nearby object recognition process, to thereby recognize and identify image components of a pair of left and right straight lane lines included in the schematic clockwise shift-corrected imaging image 113.

Further, the CPU 24 may execute a process such as an image analysis process as the nearby object recognition process, to thereby recognize and identify image components of a pair of left and right straight lane lines included in the schematic counterclockwise shift-corrected imaging image 14.

The CPU 24 may evaluate, for example, an error amount of the imaging position in the shift-corrected imaging images 113 and 114 regarding the recognized image components of the pair of left and right lane lines in the two imaging images 113 and 114.

Further, in a case where, as illustrated in FIG. 12C, an error in the shift-corrected imaging positions in the imaging images 113 and 114 regarding the image components of the pair of left and right lane lines recognized in the two shift-corrected imaging images 113 and 114 is a predetermined amount or more, the CPU 24 may not evaluate the shift correction information as favorable.

FIG. 12D is a diagram for describing an example of an evaluation method based on variations in normal direction of the schematic shift-corrected imaging images related to the imaging devices 13 to 18 to be used in the monocular process.

In FIG. 12D, arranged laterally are seven shift-corrected imaging images related to the imaging devices 13 to 18 that form a 360-degree camera and are used in the monocular process. The imaging image IRfc in the middle of the arrangement may be a shift-corrected imaging image derived from imaging of the front region of the vehicle 1 performed by the front-middle imaging device 13. The imaging image IRrc1 at the right end of the arrangement may be a shift-corrected imaging image derived from imaging of the rear region of the vehicle 1 performed by the rear-middle imaging device 18. The imaging image IRrc2 at the left end of the arrangement may be a shift-corrected imaging image derived from imaging of the rear region of the vehicle 1 performed by the rear-middle imaging device 18.

The CPU 24 may identify normal vectors 116 to 122, i.e., vectors in a direction of normal to the road surface included in the image, for the respective seven shift-corrected imaging images related to the imaging devices 13 to 18.

In one example, in a case where the shift-corrected imaging image includes a pair of lane lines, the CPU 24 may identify a normal vector of a plane between the pair of lane lines with use of the imaging positions of the pair of lane lines as references.

The CPU 24 may evaluate, for example, a variation amount of the directions of the normal vectors 116 to 122 of the respective road surfaces identified in the shift-corrected imaging images related to the imaging devices 13 to 18.

In a case where tips of the normal vectors 116 to 122 of all of the road surfaces fall within a predetermined error circle range, the CPU 24 may evaluate the pieces of shift correction information as favorable.

In a case where any one or more of the tips of the normal vectors 116 to 122 of the road surfaces fall outside the predetermined error circle range, the CPU 24 may not evaluate the pieces of shift correction information as favorable.

Note that, in one example, the CPU 24 may identify the normal vector 115 of the road surface recognized by the stereo camera 19 on the basis of the imaging image IRfr and the imaging image IRlr respectively obtained by the front-right imaging device 11 and the front-left imaging device 12 forming the stereo camera 19.

In this case, in one example, the CPU 24 may use a predetermined error circle range around the tip of the normal vector 115 related to the stereo camera 19 as a reference, and evaluate whether the variations of the directions of the normal vectors 116 to 122 of the respective road surfaces fall within the error circle range.

Thus, the CPU 24 may last generate the shift correction information related to the rear-middle imaging device 18 disposed to perform imaging of the rear region of the vehicle 1. Further, the CPU 24 may evaluate the shift correction information on the basis of one or more imaging images including at least the imaging image processed last. The CPU 24 may be able to execute evaluation of a series of pieces of shift correction information on the basis of the image component in the imaging image related to the rear-middle imaging device 18 for the monocular process processed last, for example, even when the vehicle 1 is traveling straight.

As described above, in the example embodiment, the imaging devices 11 to 18 may be disposed on the vehicle 1 to perform imaging of the vehicle external environment, and at least three imaging devices of the imaging devices 11 to 18 may be so disposed on the vehicle 1 as to be able to perform duplicated imaging of an imaging region common to the at least three imaging devices. This allows the at least three imaging devices to perform imaging of the common imaging region in the imaging images of the vehicle external environment.

Further, the CPU 24 serving as the controller of the vehicle external environment imaging apparatus 10 of the vehicle 1 may generate, with use of the imaging images obtained by the two imaging devices 11 and 12 of the at least three imaging devices, the information regarding the relative distance and the relative direction based on the parallax of the imaging target in the vehicle external environment captured in the common imaging region. The CPU 24 may be able to more reliably generate the information regarding the relative distance and the relative direction of the imaging target in the vehicle external environment included in the common imaging region, on the basis of the parallax assumable on the basis of the arrangement of the two imaging devices 11 and 12 on the vehicle 1, for example, without being influenced by a change in an imaging range or an angle of view caused by a factor such as a change in installment state of other imaging devices 13 to 18. As a result, the CPU 24 may be able to generate reliable shift correction information regarding the relative distance or the relative direction obtained by the monocular process performed in relation to at least one of the imaging devices 13, 14, and 15 of the rest of the at least three imaging devices. Further, the CPU 24 may be able to acquire a more reliable relative distance or a more reliable relative direction by using the shift correction information in the monocular process related to the imaging device 13, 14, or 15.

Further, the CPU 24 may sequentially generate, with use of the shift-corrected imaging images related to the imaging devices 14, 15, 16, and 17, the pieces of shift correction information related to the other imaging devices 16, 17, and 18 to be used in the monocular process. With the sequential use of the shift-corrected imaging images related to the imaging devices 14, 15, 16, and 17 as references, the CPU 24 may be able to generate pieces of shift correction information to be used in the monocular processes related to all of the imaging devices 13 to 18 that perform imaging of the respective divided regions into which the 360-degree surrounding region is divided. The CPU 24 may thus be able to acquire the relative distance and the relative direction of the imaging target such as the nearby object captured by the imaging devices 13 to 18 that are as reliable as the relative distance and the relative direction of the imaging target captured by the stereo camera 19.

As described above, in the example embodiment, the installment of the imaging devices 11 to 18 on the vehicle 1 to perform imaging of the vehicle external environment is favorably utilized, and at least three imaging devices may perform duplicated imaging of an imaging region common thereto. This allows for reliable correction of the relative distance and the relative direction of the imaging target in the vehicle external environment in the monocular process. As a result, in the example embodiment, even in a case where the monocular process is performed on the respective imaging images obtained by the imaging devices 13 to 18 disposed on the vehicle 1, it is possible to acquire the relative distance and the relative direction of the imaging target in the vehicle external environment expected to be as reliable as the relative distance and the relative direction obtained by the compound-eye process.

According to the example embodiment, it is possible to secure or maintain reliability of the imaging devices 11 to 18 disposed on the vehicle 1 to perform imaging of the vehicle external environment of the vehicle 1.

The above-described example embodiment is one example of the embodiment of the technology. The technology is not limited thereto, and various modifications or alternations may be made without departing from the scope of the gist of the technology.

In the example embodiment described above, the front-right imaging device 11 and the front-left imaging device 12 forming the stereo camera 19 that allows for the compound-eye process may be used as a master to generate the shift correction information for the imaging range of each of the imaging devices 13 to 18 to be used in the monocular process.

The imaging device to be used as a reference of shift correction may be an imaging device other than the imaging devices disposed to form the stereo camera 19 of the vehicle 1.

If at least three imaging devices are disposed on the vehicle 1 to be able to perform duplicated imaging of an imaging region common thereto, it is possible to generate, on the basis of a parallax of the common imaging target in the vehicle external environment in the respective imaging images obtained by two of the at least three imaging devices, the shift correction information to be used in the monocular process related to the rest of the imaging devices. Further, in the monocular process related to the rest of the imaging devices, it is possible to generate more reliable information regarding the relative distance and the relative direction with use of the generated shift correction information.

In the example embodiment described above, the vehicle 1 may be provided with the plurality of imaging devices 13 to 18 for the monocular process in order to perform imaging of all of the region surrounding the vehicle 1. The imaging devices 13 to 18 may perform imaging of the respective divided regions into which the 360-degree region surrounding the vehicle 1 is divided. Further, the shift correction information may be generated for each of the imaging devices 13 to 18.

However, in an alternative example, the vehicle 1 may be provided with an imaging device that is able to perform 360-degree imaging in order to perform imaging of all of the region surrounding the vehicle 1. It is possible to generate the shift correction information by a process similar to that described above, also for the imaging device that is able to perform 360-degree imaging.

In the example embodiment described above, the distance and the direction based on the parallax derived from the two imaging devices of the stereo camera 19, i.e., the front-right imaging device 11 and the front-left imaging device 12, may be used as references. The shift correction information regarding the distance and the direction may be generated first for another imaging device for the monocular process having an imaging range overlapped with the imaging ranges of the front-right imaging device 11 and the front-left imaging device 12, and then the shift correction information regarding the distance and the direction may be generated for another imaging device.

Thus, if there is an overlapped imaging range between the imaging image obtained by the imaging device used as a reference and the imaging image obtained by the imaging device for which correction is to be performed, the CPU 24 may use the imaging target present in the overlapped imaging range, and may thereby be able to so generate the shift correction information regarding the distance or the direction that the distance or the direction in the imaging image obtained by the imaging device for which correction is to be performed is consistent with the distance or the direction in the imaging image obtained by the imaging device used as the reference. Further, the CPU 24 may be able to generate the shift correction information regarding the distance or the direction for another imaging device having an overlapped imaging range with the imaging device for which the shift correction has thus been performed. In this case, the CPU 24 may use the imaging device for which the shift correction has already been performed as a reference, and so generate the shift correction information regarding the distance or the direction directed to consistency with the distance or the direction in the imaging image related to the imaging device used as the reference.

Moreover, in the example embodiment described above, the distance and the direction based on the parallax derived from the two imaging devices of the stereo camera 19, i.e., the front-right imaging device 11 and the front-left imaging device 12, may be used as references.

Other than the above, the vehicle 1 may be provided, for example, with another device directed to detection of a nearby object around the vehicle 1 in the vehicle external environment. Examples of such a device may include a LiDAR inputting and outputting millimeter waves and a radar inputting and outputting radio waves such as infrared rays. Scanning detection performed on the region surrounding the vehicle 1 by a device such as the LiDAR or the radar may allow the control system 9 to obtain a three-dimensional nearby-object distribution map regarding the region surrounding the vehicle 1. In one example, the CPU 24 may use the three-dimensional distribution map as a reference, and thereby generate the shift correction information regarding the distance or the direction for a first imaging device having an imaging range overlapped with the distribution map. Further, the CPU 24 may use this first imaging device as a reference to generate the shift correction information regarding the distance or the direction for the next imaging device having an imaging range overlapped with the imaging range of the first imaging device. In this case, the CPU 24 may use the imaging target present in the overlapped imaging range, and thereby so generate the shift correction information regarding the distance or the direction that the distance or the direction in the imaging image related to the next imaging device is consistent with the distance or the direction in the imaging device related to the first imaging device.

Other than the above, a GSS receiver or highly accurate three-dimensional map data may be sometimes used for the vehicle 1 in order to detect the current position or the current direction of the vehicle 1. In this case, the control system 9 may be able to obtain highly accurate relative distance and highly accurate relative direction of the nearby object present around the vehicle 1 in the vehicle external environment included in the three-dimensional map data with respect to the vehicle 1. The CPU 24 may generate the shift correction information regarding the distance or the direction for a first imaging device on the basis of the imaging position of the nearby object which is included in the three-dimensional map data and captured by the first imaging device. Further, the CPU 24 may use this first imaging device as a reference to generate the shift correction information regarding the distance or the direction for the next imaging device having an imaging range overlapped with the imaging range of the first imaging device.

In this case, the CPU 24 may use the imaging target present in the overlapped imaging range, and thereby so generate the shift correction information regarding the distance or the direction that the distance or the direction in the imaging image related to the next imaging device is consistent with the distance or the direction in the imaging device related to the first imaging device.

As described above, the CPU 24 serving as a controller may be able to generate correction information regarding the distance or the direction of the imaging target in the vehicle external environment also in a case where the two imaging devices 11 and 12 forming the stereo camera 19 are not provided. In this case, a premise may be that at least two imaging devices of the plurality of imaging devices are so disposed on the vehicle 1 as to be able to perform duplicated imaging of an imaging region common thereto. With such a premise, the CPU 24 may be able to generate, on the basis of the distance and the direction in the imaging image related to one of the at least two imaging devices that are able to perform duplicated imaging of the common imaging region, the correction information regarding the distance or the direction, based on the imaging position, of the imaging target in the vehicle external environment to be used in the monocular process performed on the imaging image of any of the rest of the imaging devices.

However, the installment of the two imaging devices 11 and 12 forming the stereo camera 19 allows the CPU 24 serving as a controller to obtain the distance and the direction as highly accurate references on the basis of the parallax derived from the stereo camera 19. This allows the CPU 24 to use the information regarding the distance and the direction based on the parallax to generate, with maintaining the high accuracy, the correction information regarding the distance or the direction, based on the imaging position, of the imaging target present in the vehicle external environment to be used in the monocular process performed on the imaging image obtained by at least one of the rest of the imaging devices. In this case, it is not necessary to define or limit the arrangement of a member other than the imaging devices, such as a LiDAR, a radar, or a GNSS receiver, so that highly precise positional relationship is achieved between the member and the imaging devices.

Each of the nearby-object recognition process unit 82, the nearby-object position information generation unit 83, the constant shift correction unit 84, the real-time shift correction unit 85, the nearby-object information output unit 86, and the vehicle control execution unit 87 illustrated in FIG. 10 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the nearby-object recognition process unit 82, the nearby-object position information generation unit 83, the constant shift correction unit 84, the real-time shift correction unit 85, the nearby-object information output unit 86, and the vehicle control execution unit 87 illustrated in FIG. 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the nearby-object recognition process unit 82, the nearby-object position information generation unit 83, the constant shift correction unit 84, the real-time shift correction unit 85, the nearby-object information output unit 86, and the vehicle control execution unit 87 illustrated in FIG. 10.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle external environment imaging apparatus comprising:
   imaging devices disposed on a vehicle to perform imaging of a vehicle external environment of the vehicle; and
   a controller configured to generate information regarding a distance, a direction, or both of a vehicle-external imaging target with use of imaging images obtained by the respective imaging devices, the vehicle-external imaging target being present in the vehicle external environment, wherein
   at least two imaging devices of the imaging devices are disposed on the vehicle to perform duplicated imaging of an imaging region common to the at least two imaging devices,
   the controller is configured to generate, on a basis of a distance and a direction in an imaging image obtained by a first one of the at least two imaging devices, correction information regarding a distance, a direction, or both of the vehicle-external imaging target based on an imaging position, the correction information being to be used in a monocular process performed on an imaging image obtained by at least one of the at least two imaging devices, the at least one of the at least two imaging devices being different from the first one of the at least two imaging devices,
   at least three imaging devices of the imaging devices are disposed on the vehicle to perform duplicated imaging of an imaging region common to the at least three imaging devices, and
   the controller is configured to:
      generate, with use of imaging images obtained by two imaging devices of the at least three imaging devices, information regarding a distance and a direction based on a parallax of the vehicle-external imaging target captured in the imaging region common to the at least three imaging devices; and
      generate, with use of the information regarding the distance and the direction based on the parallax, correction information regarding a distance, a direction, or both of the vehicle-external imaging target based on an imaging position to be used in a monocular process performed on an imaging image obtained by at least one of the at least three imaging devices, the at least one of the at least three imaging devices being different from the two imaging devices,
   the imaging devices disposed on the vehicle to perform the imaging of the vehicle external environment of the vehicle include monocular-process imaging devices,
   each of the monocular-process imaging devices is disposed so as to be able to perform duplicated imaging of an imaging region common to one of the monocular-process imaging devices and another one of the monocular-process imaging devices,
   the controller is configured to sequentially generate respective pieces of correction information for the monocular-process imaging devices in order of overlapping of the imaging region,
   the monocular-process imaging devices are disposed on the vehicle to perform imaging of respective divided regions into which all of a region surrounding the vehicle about a vertical axis of the vehicle is divided or into which all of the region surrounding the vehicle except for an imaging range of a stereo camera about the vertical axis of the vehicle is divided, and
   the controller is configured to sequentially generate the respective pieces of correction information in a first order from a first-end-side monocular-process imaging device to a last monocular-process imaging device of the monocular-process imaging devices and in a second order from a second-end-side monocular-process imaging device to the last monocular-process imaging device of the monocular-process imaging devices, the first-end-side monocular-process imaging device being able to perform duplicated imaging of an imaging region common to the first-end-side monocular-process imaging device and the stereo camera on a first end side of the imaging range of the stereo camera, the second-end-side monocular-process imaging device being able to perform duplicated imaging of an imaging region common to the second-end-side monocular-process imaging device and the stereo camera on a second end side of the imaging range of the stereo camera,
   wherein, when generating of a piece of correction information for the last monocular-process imaging device among the generating of the respective pieces of correction information, the controller is configured to generate a first-end-side correction information and a second-end-side correction information for the last monocular-process imaging device, and compare the first-end-side correction information and the second-end-side correction information with each other to thereby evaluate a series of corrections based on the respective pieces of correction information, the last monocular-process imaging device being one of the monocular-process imaging devices which is to be processed last, the first-end-side correction information being derived from a process in the first order from the first end side, the second-end-side correction information being derived from a process in the second order from the second end side.

2. The vehicle external environment imaging apparatus according to claim 1, wherein
   the imaging devices disposed on the vehicle to perform the imaging of the vehicle external environment of the vehicle include
   the two imaging devices having a mutually-fixed arrangement and forming a stereo camera, and
   at least one monocular-process imaging device that is able to perform duplicated imaging of an imaging region common to the at least one monocular-process imaging device and the two imaging devices forming the stereo camera, and
   the controller is configured to:
      generate, with use of the imaging images obtained respectively by the two imaging devices forming the stereo camera, information regarding a distance and a direction based on the parallax of the vehicle-external imaging target captured in the imaging region common to the two imaging devices forming the stereo camera and each of the at least one monocular-process imaging device; and
      generate, with use of the information regarding the distance and the direction derived from the stereo camera, correction information for the at least one monocular-process imaging device.

3. The vehicle external environment imaging apparatus according to claim 2, wherein the imaging devices disposed on the vehicle to perform the imaging of the vehicle external environment of the vehicle include monocular-process imaging devices, each of the monocular-process imaging devices is disposed so as to be able to perform duplicated imaging of an imaging region common to one of the monocular-process imaging devices and another one of the monocular-process imaging devices, and the controller is configured to sequentially generate respective pieces of correction information for the monocular-process imaging devices in order of overlapping of the imaging region.

4. The vehicle external environment imaging apparatus according to claim 1, wherein the monocular-process imaging devices are disposed on the vehicle so as to perform imaging of each of divided regions into which a region surrounding the vehicle is divided, and the another one of the monocular-process imaging devices is adjacent to the one of the monocular-process imaging devices in a direction in which the region surrounding the vehicle is divided.

5. The vehicle external environment imaging apparatus according to claim 3, wherein the monocular-process imaging devices are disposed on the vehicle so as to perform imaging of each of divided regions into which a region surrounding the vehicle is divided, and the another one of the monocular-process imaging devices is adjacent to the one of the monocular-process imaging devices in a direction in which the region surrounding the vehicle is divided.

6. The vehicle external environment imaging apparatus according to claim 1, wherein the controller is configured to, upon generating the respective pieces of correction information for the monocular-process imaging devices, use a stereo camera as a reference and thereby sequentially generate the respective pieces of correction information in order from a monocular-process imaging device, of the monocular-process imaging devices, that is able to perform duplicated imaging of an imaging region common to the monocular-process imaging device and the stereo camera, the stereo camera including the two imaging devices having a mutually-fixed arrangement of the imaging devices disposed on the vehicle to perform the imaging of the vehicle external environment of the vehicle.

7. The vehicle external environment imaging apparatus according to claim 4, wherein the controller is configured to, upon generating the respective pieces of correction information for the monocular-process imaging devices, use a stereo camera as a reference and thereby sequentially generate the respective pieces of correction information in order from a monocular-process imaging device, of the monocular-process imaging devices, that is able to perform duplicated imaging of an imaging region common to the monocular-process imaging device and the stereo camera, the stereo camera including the two imaging devices having a mutually-fixed arrangement of the imaging devices disposed on the vehicle to perform the imaging of the vehicle external environment of the vehicle.

8. The vehicle external environment imaging apparatus according to claim 4, wherein the monocular-process imaging devices are disposed on the vehicle to perform imaging of respective divided regions into which all of a region surrounding the vehicle about a vertical axis of the vehicle is divided or into which all of the region surrounding the vehicle except for an imaging range of the stereo camera about the vertical axis of the vehicle is divided, and the controller is configured to sequentially generate the respective pieces of correction information in a first order from a first-end-side monocular-process imaging device to a last monocular-process imaging device of the monocular-process imaging devices and in a second order from a second-end-side monocular-process imaging device to the last monocular-process imaging device of the monocular-process imaging devices, the first-end-side monocular-process imaging device being able to perform duplicated imaging of an imaging region common to the first-end-side monocular-process imaging device and the stereo camera on a first end side of the imaging range of the stereo camera, the second-end-side monocular-process imaging device being able to perform duplicated imaging of an imaging region common to the second-end-side monocular-process imaging device and the stereo camera on a second end side of the imaging range of the stereo camera, wherein, when generating of a piece of correction information for the last monocular-process imaging device among the generating of the respective pieces of correction information, the controller is configured to generate a first-end-side correction information and a second-end-side correction information for the last monocular-process imaging device, and compare the first-end-side correction information and the second-end-side correction information with each other to thereby evaluate a series of corrections based on the respective pieces of correction information, the last monocular-process imaging device being one of the monocular-process imaging devices which is to be processed last, the first-end-side correction information being derived from a process in the first order from the first end side, the second-end-side correction information being derived from a process in the second order from the second end side.

9. The vehicle external environment imaging apparatus according to claim 1, wherein the last monocular-process imaging device is disposed so as to perform imaging of a region on a rear side of the vehicle, and the controller is configured to evaluate the series of corrections on a basis of information regarding a road imaged in a corrected imaging image related to the last monocular-process imaging device.

10. The vehicle external environment imaging apparatus according to claim 8, wherein the last monocular-process imaging device is disposed so as to perform imaging of a region on a rear side of the vehicle, and the controller is configured to evaluate the series of corrections on a basis of information regarding a road imaged in a corrected imaging image related to the last monocular-process imaging device.

11. The vehicle external environment imaging apparatus according to claim 1, wherein the controller is configured to, in a case where the series of corrections are not evaluated as favorable, output a notification or a maintenance request.

12. The vehicle external environment imaging apparatus according to claim 9, wherein the controller is configured to, in a case where the series of corrections are not evaluated as favorable, output a notification or a maintenance request.

13. The vehicle external environment imaging apparatus according to claim 1, wherein correction information regarding a distance, a direction, or both of the vehicle-external imaging target based on an imaging position to be used in a monocular process performed on an imaging image obtained by each of the monocular-process imaging devices is correction information regarding a distance, a direction, or both using, as a reference, an imaging position of the each of the monocular-process imaging devices in an imaging image set for the monocular process for the each of the monocular-process imaging devices.

14. The vehicle external environment imaging apparatus according to claim 1, wherein
the controller is configured to, in a monocular process of acquiring the distance, the direction, or both of the vehicle-external imaging target captured by the imaging devices,
perform a correction process with use of the correction information, and
acquire the distance, the direction, or both corrected on a basis of an attitude of the vehicle.

* * * * *